US012756584B2

(12) United States Patent
Fujimoto et al.

(10) Patent No.: US 12,756,584 B2
(45) Date of Patent: Oct. 6, 2026

(54) DATA TRANSMISSION DEVICE ON SERVER, DATA TRANSMISSION METHOD AND PROGRAM ON SERVER

(71) Applicant: NTT, Inc., Tokyo (JP)

(72) Inventors: Kei Fujimoto, Musashino (JP); Shogo Saito, Musashino (JP); Tetsuro Nakamura, Musashino (JP)

(73) Assignee: NTT, Inc., Tokyo (JP)

( * ) Notice: Subject to any disclaimer, the term of this patent is extended or adjusted under 35 U.S.C. 154(b) by 434 days.

(21) Appl. No.: 18/579,035

(22) PCT Filed: Jul. 19, 2021

(86) PCT No.: PCT/JP2021/027049
§ 371 (c)(1),
(2) Date: Jan. 12, 2024

(87) PCT Pub. No.: WO2023/002547
PCT Pub. Date: Jan. 26, 2023

(65) Prior Publication Data
US 2024/0333541 A1 Oct. 3, 2024

(51) Int. Cl.
*H04L 12/12* (2006.01)
*G06F 9/455* (2018.01)
*H04L 49/90* (2022.01)

(52) U.S. Cl.
CPC .......... *H04L 12/12* (2013.01); *G06F 9/45558* (2013.01); *H04L 49/9031* (2013.01); *G06F 2009/45595* (2013.01)

(58) Field of Classification Search
CPC ....... G06F 9/45558; G06F 2009/45595; H04L 49/9031; H04L 12/12
See application file for complete search history.

(56) References Cited

U.S. PATENT DOCUMENTS

2020/0396172 A1* 12/2020 Wang .................... H04L 47/522
2020/0412655 A1* 12/2020 Thyagaturu ......... H04L 63/0254

FOREIGN PATENT DOCUMENTS

JP 2015-197874 11/2015
JP 2018-032156 3/2018

OTHER PUBLICATIONS

Fujimoto et al., "KBP: Kernel Enhancements for Low-Latency Networking without Application Customization in Virtual Server," 2021 IEEE 18th Annual Consumer Communications & Networking Conference (CCNC), Jan. 9-12, 2021, Las Vegas, NV, USA, 7 pages.

(Continued)

*Primary Examiner* — Wissam Rashid
(74) *Attorney, Agent, or Firm* — Fish & Richardson P.C.

(57) ABSTRACT

An on-server data transmission device that performs data transfer control on an interface part in a user space includes: a data transfer part configured to launch a thread that monitors packet arrivals using a polling model; and a sleep control manager configured to manage data arrival schedule information and deliver the data arrival schedule information to the data transfer part. The data transfer part is configured to put the thread into a sleep state based on the data arrival schedule information delivered from the sleep control manager and cause a timer to expire immediately before an arrival of data to perform cancellation of the sleep state, causing the thread to wake up.

10 Claims, 21 Drawing Sheets

(56) References Cited

OTHER PUBLICATIONS

LWN.net [online], "New API Intel," Jan. 2002, retrieved on Jul. 2021, retrieved from URL<http://lwn.net/2002/0321/a/napi-howto.php3>, 10 pages.

NTT-TX.co.jp [online], "Resource Setting (NIC)—DPDK Primer, vol. 6 (in Japanese) (Resource Setting (NIC)—Introduction to DPDK, Part 6)," Jun. 2019, retrieved on Jul. 2021, retrieved from URL<https://www.ntt-tx.co.jp/column/dpdk_blog/190610/>, 22 pages (with machine translation).

* cited by examiner

DATA TRANSMISSION DEVICE ON SERVER, DATA TRANSMISSION METHOD AND PROGRAM ON SERVER

CROSS-REFERENCE TO RELATED APPLICATIONS

This is a National Stage Application of PCT Application No. PCT/JP2021/027049, filed on Jul. 19, 2021. The disclosure of the prior application is considered part of the disclosure of this application, and is incorporated in its entirety into this application.

BACKGROUND

Technical Field

The present invention relates to an on-server data transmission device, an on-server data transmission method, and an on-server data transmission program.

Background Art

Against the background of advances in virtualization technology achieved through NFV (Network Functions Virtualization), systems are being constructed and operated on a per-service basis. Also, a mode called SFC (Service Function Chaining) is becoming mainstream, in which, based on the above-described mode of constructing a system on a per-service basis, service functions are divided into units of reusable modules and are operated on independent virtual machine (VM: Virtual Machine, container, etc.) environments, and thereby the service functions are used as needed in a manner as if they are components, and the operability is improved.

A hypervisor environment consisting of Linux (registered trademark) and a KVM (kernel-based virtual machine) is known as a technology for forming a virtual machine. In this environment, a Host OS (an OS installed on a physical server is called a "Host OS") in which a KVM module is incorporated operates as a hypervisor in a memory area called kernel space, which is different from user spaces. In this environment, the virtual machine operates in a user space, and a Guest OS (an OS installed on a virtual machine is called a Guest OS) operates in the virtual machine.

Unlike the physical server in which the Host OS operates, in the virtual machine in which the Guest OS operates, all hardware (HW) including network devices (such as Ethernet (registered trademark) card devices) is controlled via registers, which is needed for interrupt processing from the HW to the Guest OS and for writing from the Guest OS to the hardware. In such register-based control, the performance is generally lower than that in the Host OS environment because the notifications and processing that would have been executed by physical hardware are emulated virtually by software.

To deal with this degraded performance, there is a technique of reducing HW emulation from a Guest OS, in particular, for a Host OS and an external process present outside of the virtual machine of the Guest OS, to improve performance and versatility of communication using a high-speed and consistent interface. As such a technique, a device abstraction technique called virtio, that is, a para-virtualization technique, has been developed and already been applied to many general-purpose OSes, such as FreeBSD (registered trademark) as well as Linux (registered trademark) and currently put into practical use (see Patent Literatures 1 and 2).

In virtio, regarding data input/output such as console input/output, file input/output, and network communication, as a unidirectional data transfer transport, data exchange using a queue designed with a ring buffer are defined as queue operations. With the use of the queue specification in virtio, the number and the size of queues suitable for each device are prepared at the time of activation of the Guest OS. Thus, communication between the Guest OS and the outside of its own virtual machine can be performed simply through an operation using a queue, without execution of hardware emulation.

Packet Transfer in Interrupt Model (Example of General-Purpose VM Configuration)

FIG. 19 is an explanatory diagram illustrating packet transfer operations performed according to the interrupt model in a server virtualization environment which is configured with a general-purpose Linux kernel (registered trademark) and a VM.

HW 10 includes a network interface card (NIC) 11 (physical NIC) (interface part), and performs communication for data transmission and reception with a data processing application (APL) 1 in a user space 60 via a virtual communication channel constructed by a Host OS 20, a KVM 30, which is a hypervisor that constructs virtual machines, virtual machines (VM 1, VM 2) 40, and a Guest OS 50. In the following description, as indicated by the thick arrows in FIG. 19, the data flow in which data processing APL 1 receives a packet from HW 10 is referred to as "Rx-side reception", and the data flow in which data processing APL 1 transmits a packet to HW 10 is called "Tx-side transmission".

Host OS 20 includes a kernel 21, a Ring Buffer 22, and a Driver 23. Kernel 21 includes a vhost-net module 221A, which is a kernel thread, a TAP device 222A, and a virtual switch (br) 223A.

TAP device 222A is a kernel device of a virtual network and is supported by software. Virtual machine (VM 1) 40 is configured such that Guest OS 50 and Host OS 20 can communicate via virtual switch (br) 223A created in a virtual bridge. TAP device 222A is a device connected to a Guest OS 50's virtual NIC (vNIC) created in this virtual bridge.

Host OS 20 copies the configuration information (sizes of shared buffer queues, number of queues, identifiers, information on start addresses for accessing the ring buffers, etc.) constructed in the virtual machine of Guest OS 50 to vhost-net module 221A, and constructs, inside Host OS 20, information on the endpoint on the virtual machine side. This vhost-net module 221A is a kernel-level back end for virtio networking, and can reduce virtualization overhead by moving virtio packet processing tasks from the user area (user space) to vhost-net module 221A of kernel 21.

Guest OSes 50 include a Guest OS (Guest 1) installed on the virtual machine (VM 1) and a Guest OS (Guest 2) installed on the virtual machine (VM 2), and Guest OSes 50 (Guest 1, Guest 2) operate in virtual machines (VM 1, VM 2) 40. Taking Guest 1 as an example of Guest OSes 50, Guest OS 50 (Guest 1) includes a kernel 51, a Ring Buffer 52, and a Driver 53, and Driver 53 includes a virtio-driver 531.

Specifically, as PCI (Peripheral Component Interconnect) devices, there are respective virtio devices for console input/output, file input/output, and network communication in the virtual machine (the device for the console, which is called virtio-console, the device for file input/output, which is called virtio-blk, and the device for the network, which is called virtio-net, and their corresponding drivers included in the OS are each defined with a virtio queue). When Guest OS starts up, two data transfer endpoints (transmission/reception endpoints) for each device are created between Guest OS and the counterpart side, and a parent-child relationship for data transmission and reception is constructed. In many cases, the parent-child relationship is formed between the virtual machine side (child side) and the Guest OS (parent side).

The child side exists as configuration information of each device in the virtual machine, and requests the size of each data area, the number of combinations of needed endpoints, and the type of the device to the parent side. In accordance with the request from the child side, the parent side allocates and maintains memory for a shared buffer queue for accumulating and transferring the needed amount of data, and sends the address of the memory as a response to the child side so that the child side can access it. Operations of the shared buffer queue necessary for data transfer are uniformly defined in virtio, and are performed in a state where both the parent side and the child side have agreed on the definition. Furthermore, the size of the shared buffer queue also has been agreed on by both sides (i.e., it is determined for each device). As a result, it is possible to operate the queue shared by both the parent side and the child side by merely communicating the address to the child side.

As each shared buffer queue prepared in virtio is prepared for one direction, for example, a virtual network device called a virtio-net device is constituted by three Ring Buffers 52 for transmission, reception, and control. Communication between the parent and the child is realized by writing to the shared buffer queue and performing a buffer update notification. That is, after writing to the Ring Buffer 52, a notification is made to the counterpart. Upon receipt of the notification, the counterpart side uses common operations of virtio to check which shared buffer queue contains the new data and check how much the new data is, and retrieves a new buffer area. As a result, transfer of data from the parent to the child or from the child to the parent is achieved.

As described above, by sharing Ring Buffer 52 for mutual data exchange and the operation method (used in common in virtio) for each ring buffer between the parent and the child, communication between Guest OS 50 and the outside, which does not require hardware emulation, is realized. This makes it possible to realize transmission and reception of data between Guest OS 50 and the outside at a high speed compared to the conventional hardware emulations.

If Guest OS 50 in the virtual machine communicates with the outside, the child side needs to connect to the outside and transmit and receive data as a relay between the outside and the parent side. For example, communication between Guest OS 50 and Host OS 20 is one example. Here, if the outside is Host OS 20, two patterns are present as existing communication methods.

In the first method (hereinafter referred to as "external communication method 1"), a child-side endpoint is constructed in the virtual machine, and a communication between Guest OS 50 and Host OS 20 is connected in the virtual machine to a communication endpoint (usually called a "TAP/TUN device") provided by Host OS 20. This connection constructs a connection as follows and thus realizes communication from Guest OS 50 to Host OS 20.

In this case, Guest OS 50 operates in a memory area that is a user space having privileges different from a memory area called kernel space, in which the TAP driver and Host OS 20 operate. For this reason, at least one memory copy occurs in the communication from Guest OS 50 to Host OS 20.

In the second method (hereinafter referred to as "external communication method 2"), a technology called vhost-net exists as means for solving this. According to the vhost-net, parent-side configuration information (sizes of shared buffer queues, number of queues, identifiers, information on start addresses for accessing ring buffers, etc.) once constructed in the virtual machine is copied into the vhost-net module 221A inside the Host OS 20, and information on the endpoints of the child side is constructed inside the host. Vhost-net is a technology that enables operations on shared buffer queues to be carried out directly between Guest OS 50 and Host OS 20 by this construction. As a result, the number of copy operations is substantially zero, and data transfer can be realized at a higher speed than the external communication method 1 because the number of copy operations is less by one compared to virtio-net.

In this manner, in the case of Host OS 20 and Guest OS 50 connected by virtio, packet transfer processing can be sped up by reducing the number of virtio-net related memory copy operations.

Note that in kernel v4.10 (February 2017-) and later, the specifications of the TAP interface have changed, and packets inserted from the TAP device are completed in the same context as the processing of copying packets to the TAP device. Accordingly, software interrupts (softIRQ) no longer occur.

Packet Transfer in Polling Model (Example of DPDK)

The method of connecting and coordinating virtual machines is called Inter-VM Communication, and in large-scale environments such as data centers, virtual switches have been typically used in connections between VMs. However, since it is a method with a large communication delay, faster methods have been newly proposed. For example, a method of using special hardware called SR-IOV (Single Root I/O Virtualization), a method performed with software using Intel DPDK (Intel Data Plane Development Kit) (hereinafter referred to as DPDK), which is a high-speed packet processing library, and the like have been proposed (see Non-Patent Literature 1).

DPDK is a framework for controlling a network interface card (NIC), which was conventionally controlled by a Linux kernel (registered trademark), in a user space. The biggest difference from the processing in the Linux kernel is that it has a polling-based reception mechanism called pull mode driver (PMD). Normally, with a Linux kernel, an interrupt occurs upon arrival of data on the NIC, and this interrupt triggers the execution of reception processing. On the other hand, in a PMD, a dedicated thread continuously checks arrival of data and performs reception processing. High-speed packet processing can be performed by eliminating the overhead of context switching, interrupts, and the like. DPDK significantly increases packet processing performance and throughput, making it possible to ensure more time for processing of data plane applications.

DPDK exclusively uses computer resources such as a CPU (Central Processing Unit) and an NIC. For this reason, it is difficult to apply it to an application, such as SFC, that flexibly reconnects in units of modules. There is SPP (Soft Patch Panel), which is an application for mitigating this. SPP omits packet copy operations in the virtualization layer by adopting a configuration in which shared memory is prepared between VMs and each VM can directly reference the same memory space. Also, DPDK is used to speed up exchanging packets between a physical NIC and the shared memory. In SPP, the input destination and output destination of a packet can be changed by software by controlling the reference destination for the memory exchange by each VM. Through this process, SPP realizes dynamic connection switching between VMs, and between a VM and a physical NIC (see Non-Patent Literature 2).

FIG. 20 is an explanatory diagram illustrating packet transfer performed based on a polling model in an OvS-DPDK (Open vSwitch with DPDK) configuration. The same components as those in FIG. 19 are denoted by the same reference signs thereas, and descriptions of overlapping portions are omitted.

As illustrated in FIG. 20, a Host OS 20 includes an OvS-DPDK 70, which is software for packet processing; and OvS-DPDK 70 includes a vhost-user 71, which is a function part for connecting to a virtual machine (here, VM 1), and a dpdk (PMD) 72, which is a function part for connecting to an NIC (DPDK) 11 (physical NIC).

Moreover, a data processing APL 1A includes a dpdk (PMD) 2, which is a function part that performs polling in the Guest OS 50 section. That is, data processing APL 1A is an APL obtained by modifying data processing APL 1 illustrated in FIG. 19 by equipping data processing APL 1 with dpdk (PMD) 2.

As an extension of DPDK, packet transfer performed based on the polling model enables a routing operation using a GUI in an SPP that rapidly performs packet copy operations between Host OS 20 and Guest OS 50 and between Guest OSes 50 via shared memory with zero-copy operation.

Rx-Side Packet Processing by New API (NAPI)

FIG. 21 is a schematic diagram of Rx-side packet processing by New API (NAPI) implemented in Linux kernel 2.5/2.6 and later versions (see Non-Patent Literature 1). The same components as those in FIG. 19 are denoted by the same reference signs thereas.

As illustrated in FIG. 21, New API (NAPI) executes, on a server including an OS 70 (e.g., a Host OS), a data processing APL 1 deployed in a user space 60, which can be used by a user, and performs packet transfer between an NIC 11 of HW 10, connected to the OS 70, and data processing APL 1.

OS 70 has a kernel 71, a ring buffer 72, and a driver 73, and kernel 71 has a protocol processor 74.

Kernel 71 has the function of the core part of OS 70 (e.g., Host OS). Kernel 71 monitors hardware and manages execution status of programs, on a per-process basis. Here, kernel 71 responds to requests from data processing APL 1 and conveys requests from HW 10 to data processing APL 1. In response to a request from data processing APL 1, kernel 71 performs processing via a system call (a "user program operating in a non-privileged mode" requests processing to a "kernel operating in a privileged mode").

Kernel 71 transmits packets to data processing APL 1 via a Socket 75. Kernel 71 receives packets from data processing APL 1 via socket 75.

Ring buffer 72 is managed by kernel 71 and is in the memory space in the server. Ring buffer 72 is a constant-sized buffer that stores messages output by kernel 71 as logs, and is overwritten from the beginning when the messages exceed a maximum size.

Driver 73 is a device driver for monitoring hardware in kernel 71. Incidentally, driver 73 depends on kernel 71, and is replaced if the source code of the created (built) kernel is modified. In this case, a corresponding driver source code is to be obtained and rebuilding is to be performed on the OS that will use the driver, to create the driver.

Protocol processor 74 performs protocol processing of L2 (data link layer)/L3 (network layer)/L4 (transport layer), which are defined by the Open Systems Interconnection (OSI) reference model.

Socket 75 is an interface for kernel 71 to perform inter-process communication. Socket 75 has a socket buffer and does not frequently cause a data copying process. The flow up to the establishment of communication via Socket 75 is as follows. 1. The server side creates a socket file according to which the server side accepts clients. 2. Name the acceptance socket file. 3. Create a socket queue. 4. Accept a first connection from a client that is in the socket queue. 5. The client side creates a socket file. 6. The client side sends a connection request to the server. 7. The server side creates a connection socket file separately from the acceptance socket file. As a result of establishing communication, data processing APL 1 becomes able to call a system call, such as read( ) and write( ), to kernel 71.

In the above configuration, kernel 71 receives a notification of a packet arrival from NIC 11 via a hardware interrupt (hardIRQ) and schedules a software interrupt (softIRQ) for packet processing.

Above-described New API (NAPI), implemented in Linux kernel 2.5/2.6 and later versions, processes, upon arrival of a packet, the packet by a software interrupt (softIRQ) after the hardware interrupt (hardIRQ). As illustrated in FIG. 21, in packet transfer based on the interrupt model, a packet is transferred through interrupt processing (see reference sign c in FIG. 21), and therefore a wait due to the interrupt processing occurs and the delay in packet transfer increases.

An overview of Rx-side packet processing of NAPI will be described below.

Configuration of Rx-Side Packet Processing by New API (NAPI)

FIG. 22 is an explanatory diagram for explaining an overview of Rx-side packet processing by New API (NAPI) at the part surrounded by the dashed line in FIG. 21.

<Device Driver>

As illustrated in FIG. 22, components deployed in the device driver include; NIC 11, which is a network interface card (physical NIC); hardIRQ 81, which is a handler called due to the generation of a processing request from NIC 11 to perform the requested processing (hardware interrupt); and netif_rx 82, which is a processing function part for the hardware interrupt.

<Networking Layer>

The components deployed in the networking layer include: softIRQ 83, which is a handler called due to the generation of a processing request from netif_rx 82 to perform the requested processing (software interrupt); and do_softirq 84, which is a control function part that performs the actual part of the software interrupt (softIRQ). The components deployed in the networking layer further include: net_rx_action 85, which is a packet processing function part that is executed upon reception of the software interrupt (softIRQ); a poll_list 86, in which information on a net device (net_device), indicative of which device the hardware interrupt from NIC 11 comes from, is registered; netif_receive_skb 87, which creates a sk_buff structure (structure for enabling the kernel 71 to know the structure of the packet); and a ring buffer 72.

<Protocol Layer>

The components deployed in the protocol layer include: ip_rcv 88, arp_rcv 89, and the like, which are packet processing function parts.

The above-described netif_rx 82, do_softirq 84, net_rx_action 85, netif_receive_skb 87, ip_rcv 88, and arp_rcv 89 are program components (function names) used for packet processing in kernel 71.

Rx-Side Packet Processing Operation by New API (NAPI)

The arrows (reference signs) d to o in FIG. 22 indicate the flow of the Rx-side packet processing.

A hardware function part 11*a* of NIC 11 (hereinafter referred to as "NIC 11") is configured to, upon reception of a packet in a frame (or upon reception of a frame) from a remote device, copy the arrived packet to ring buffer 72 by a Direct Memory Access (DMA) transfer (see reference sign d in FIG. 22), without using the CPU. Ring buffer 72 is managed by kernel 71 in a memory space in the server (see FIG. 21).

However, kernel 71 cannot notice the arrived packet simply by NIC 11 copying the arrived packet to ring buffer 72. In view of this, when the packet arrives, NIC 11 raises a hardware interrupt (hardIRQ) to hardIRQ 81 (see reference sign e in FIG. 22) and netif_rx 82 performs the processing described below, which causes kernel 71 to notice the packet. Incidentally, the notation of an ellipse surrounding hardIRQ 81, illustrated in FIG. 22, represents a handler rather than a function part.

netif_rx 82 has a function of performing actual processing. When hardIRQ 81 (handler) has started execution (see reference sign fin FIG. 22), netif_rx 82 stores, into poll_list 86, information on a net device (net_device), which is one piece of information of the content of the hardware interrupt (hardIRQ) and which indicates which device the hardware interrupt from NIC 11 comes from, and registers, in poll_list 86, a dequeuing operation (referencing the content of a packet pooled in a buffer and, processing to be performed on the packet, taking into account the processing to be performed next, removing the corresponding queue entry from the buffer) (see reference sign g in FIG. 22). Specifically, netif_rx 82, in response to the packet having been loaded into ring buffer 72, registers a dequeuing operation in poll_list 86 using a driver of NIC 11 (see reference sign g in FIG. 22). As a result, information on the dequeuing operation due to the packet having been loaded into ring buffer 72 is registered into poll_list 86.

In this way, in the device driver illustrated in FIG. 22, upon reception of a packet, NIC 11 copies the arrived packet to ring buffer 72 by a DMA transfer. In addition, NIC 11 raises hardIRQ 81 (handler), and netif_rx 82 registers net_device in poll_list 86 and schedules a software interrupt (softIRQ).

With the above-described processing, the hardware interrupt processing in device driver illustrated in FIG. 22 ends.

netif_rx 82 passes up, to softIRQ 83 (handler) via a software interrupt (softIRQ) (see reference sign h in FIG. 22), a request for dequeuing data stored in ring buffer 72 using information (specifically, a pointer) enqueued in the queue stacked in poll_list 86, thereby to communicate the request to notify do_softirq 84, which is a software interrupt control function part (see reference sign i in FIG. 22).

do_softirq 84 is a software interrupt control function part that defines functions of the software interrupt (there are various types of packet processing; the interrupt processing is one of them; it defines the interrupt processing). Based on the definition, do_softirq 84 notifies net_rx_action 85, which performs actual software interrupt processing, of a request for processing the current (corresponding) software interrupt (see reference sign j in FIG. 22).

When the order of the softIRQ comes, net_rx_action 85 calls, according to net_device registered in poll_list 86 (see reference sign k in FIG. 22), a polling routine configured to dequeue a packet from ring buffer 72, to dequeue the packet (see reference sign 1 in FIG. 22). At this time, net_rx_action 85 continues the dequeuing until poll_list 86 becomes empty.

Thereafter, net_rx_action 85 notifies netif_receive_skb 87 (see reference sign m in FIG. 22).

netif_receive_skb 87 creates a sk_buff structure, analyzes the content of the packet, and assigns processing to the protocol processor 74 arranged in the subsequent stage (see FIG. 21) in a manner depending on the type. That is, netif_receive_skb 87 analyzes the content of the packet and, when processing is to be performed according to the content of the packet, assigns (see reference sign n in FIG. 22) the processing to ip_rcv 88 of the protocol layer, and, for example, in the case of L2, assigns processing to arp_rcv 89 (see reference sign o in FIG. 22).

Non-Patent Literature 3 describes a server network delay control device (KBP: Kernel Busy Poll). KBP constantly monitors packet arrivals according to a polling model in a kernel. With this, softIRQ is refrained, and low-latency packet processing is achieved.

FIG. 23 illustrates an example of a transfer of video image data (30 FPS). The workload illustrated in FIG. 23 is to intermittently perform data transfer every 30 ms at a transfer rate of 350 Mbps.

FIG. 24 is a graph illustrating the CPU usage rate that is used by a busy-poll thread of KBP described in Non-Patent Literature 3.

As illustrated in FIG. 24, in the case of KBP, the kernel thread occupies a CPU core to perform busy polling. Even in the intermittent packet reception illustrated in FIG. 23, the CPU is used all the time in the case of KBP, regardless of whether a packet has arrived. This leads into a problem of an increase in the power consumption.

Next, a DPDK system is described.

[DPDK System Configuration]

FIG. 25 is a diagram illustrating the configuration of a DPDK system that controls HW 110 including an accelerator 120.

The DPDK system includes HW 110, an OS 140, a DPDK 150, which is high-speed data transfer middleware deployed in a user space 160, and data processing APL 1.

Data processing APL 1 is packet processing to be performed prior to execution of an APL.

HW 110 performs data transmission/reception communication with data processing APL 1. In the following description, as shown in FIG. 25, the data flow in which data processing APL 1 receives a packet from HW 110 is referred to as "Rx-side reception", and the data flow in which data processing APL 1 transmits a packet to HW 110 is referred to as "Tx-side transmission".

HW 110 includes accelerator 120 and NICs 130 (physical NICs) for connecting to communication networks.

Accelerator 120 is computing unit hardware that performs a specific operation at high speed based on an input from the CPU. Specifically, accelerator 120 is a programmable logic device (PLD) such as a graphics processing unit (GPU) or a field programmable gate array (FPGA). In FIG. 25, accelerator 120 includes a plurality of cores (core processors) 121, Rx queues 122 and Tx queues 133 that hold data in first-in-first-out list structures.

Part of the processing by data processing APL 1 is offloaded to accelerator 120, to achieve performance and power efficiency that cannot be achieved only by software (CPU processing).

There will be cases where accelerator 120 described above is applied in a large-scale server cluster such as a data center that implements network functions virtualization (NFV) or a software defined network (SDN).

NIC 130 is NIC hardware that forms a NW interface. NIC 130 includes an Rx queue 131 and a Tx queue 132 that hold data in first-in first-out list structures. NIC 130 is connected to a remote device 170 via, for example, a communication network and performs packet transmission/reception.

Note that NIC 130 may be a SmartNIC, which is an NIC equipped with an accelerator, for example. A SmartNIC is a NIC capable of offloading burdensome processing, such as IP packet processing that causes a decrease in processing capacity, to reduce the load of the CPU.

DPDK 150 is a framework for performing NIC control in user space 160, and specifically, is formed with high-speed data transfer middleware. DPDK 150 includes poll mode drivers (PMDs) 151 (drivers capable of selecting data arrival either in a polling mode or in an interrupt mode), which are each a polling-based reception mechanism. In each PMD 151, a dedicated thread continuously checks arrivals of data and performs reception processing.

DPDK 150 implements a packet processing function in user space 160 in which the APL operates, and, from user space 160, performs dequeuing immediately when a packet arrives in a polling model, to shorten the packet transfer delay. That is, as DPDK 150 performs dequeuing of packets with polling (busy-polling the queues by CPU), there is no wait, and the delay is short.

CITATION LIST

Patent Literature

Patent Literature 1: JP 2015-197874 A
Patent Literature 2: JP 2018-32156 A

Non-Patent Literature

Non-Patent Literature 1: New API Intel, [online], [retrieved on Jul. 5, 2021], the Internet <http://lwn.net/2002/0321/a/napi-howto.php3>

Non-Patent Literature 2: "Resource Setting (NIC)-DPDK Primer, Vol. 6 (in Japanese) (Resource Setting (NIC)—Introduction to DPDK, Part 6)", NTT TechnoCross, [online], [retrieved on Jul. 5, 2021], the Internet <https://www.ntt-tx.co.jp/column/dpdk_blog/190610/>

Non-Patent Literature 3: Kei Fujimoto, Kenichi Matsui, Masayuki Akutsu, "KBP: Kernel Enhancements for Low-Latency Networking without Application Customization in Virtual Server", IEEE CCNC 2021.

SUMMARY OF THE INVENTION

Technical Problem

However, the packet transfer based on the interrupt model and the packet transfer based on the polling model have the following problems.

In the interrupt model, the kernel that receives an event (hardware interrupt) from the HW performs packet transfer through software interrupt processing for performing packet processing. As the interrupt model transfers packets through an interrupt (software interrupt) processing, there is a problem in that when a contention with other interrupts occurs and/or when the interrupt destination CPU is in use by a process with a higher priority, a wait occurs, and thus the delay in packet transfer increases. In this case, if the interrupt processing is congested, the wait delay further increases.

For example, as illustrated in FIG. 19, in packet transfer based on the interrupt model, a packet is transferred through interrupt processing (see reference signs a and b in FIG. 19), and therefore a wait due to the interrupt processing occurs and the delay in packet transfer increases.

A supplemental description will be given of the mechanism by which a delay occurs in the interrupt model.

In a general kernel, in packet transfer processing, packet transfer processing is performed in software interrupt processing after hardware interrupt processing.

When a software interrupt for packet transfer processing occurs, the software interrupt processing cannot be executed immediately under the conditions (1) to (3) described below. Thus, a wait in the order of milliseconds occurs due to the interrupt processing being mediated and scheduled by a scheduler such as ksoftirqd (a kernel thread for each CPU; executed when the load of the software interrupt becomes high).

(1) When there is a contention with other hardware interrupt processing
(2) When there is a contention with other software interrupt processing
(3) When the interrupt destination CPU is in use by another process or a kernel thread (migration thread, etc.), which has a higher priority.

Under the above conditions, the software interrupt processing cannot be executed immediately.

In addition, a NW delay in the order of milliseconds also occurs in the same manner in the packet processing by New API (NAPI) due to a contention with an interrupt processing (softIRQ), as indicated in the dashed box p in FIG. 22.

<Problem of KBP>

As described above, KBP is able to refrain softIRQ by constantly monitoring packet arrivals according to a polling model in the kernel, and thus is able to achieve low-latency packet processing.

However, as the kernel thread that constantly monitors packet arrivals occupies a CPU core and uses the CPU time all the time, there is a problem in that the power consumption increases. Referring now to FIGS. 23 and 24, a description will be given of a relationship between workload and the CPU usage rate.

As illustrated in FIG. 24, in the case of KBP, the kernel thread occupies a CPU core to perform busy polling. Even in the intermittent packet reception illustrated in FIG. 23, the CPU is used all the time in the case of KBP, regardless of whether a packet has arrived. Therefore, there is a problem in that the power consumption increases.

DPDK has a problem similar to that of the KBP.

<Problem of DPDK>

In DPDK, a kernel thread occupies the CPU core to perform polling (busy-polling the queues by the CPU). Therefore, even in the intermittent packet reception illustrated in FIG. 23, 100% of the CPU is always used in the case of DPDK, regardless of whether a packet has arrived. Therefore, there is a problem in that the power consumption increases.

As described above, as DPDK embodies the polling model in a user space, no softIRQ contention occurs. As KBP embodies the polling model in the kernel, no softIRQ contention occurs. Thus, low-latency packet transfer is possible. However, both DPDK and KBP unnecessarily use CPU resources to constantly monitor packet arrivals, regardless of whether a packet has arrived. Therefore, there is a problem in that the power consumption increases.

The present invention has been made in view of such a background, and the present invention aims to lower the CPU usage rate to save power while maintaining low latency.

Means for Solving the Problem

To solve the above problem, an on-server data transmission device performs, in a user space, data transfer control on an interface part. An OS includes: a kernel; a ring-structured buffer in a memory space in which a server deploys the OS; and a driver capable of selecting a data arrival from the interface part either in a polling mode or in an interrupt mode. The on-server data transmission device includes: a data transfer part configured to launch a thread that monitors a packet arrival using a polling model; and a sleep control manager configured to manage data arrival schedule information and deliver the data arrival schedule information to the data transfer part, to perform sleep control on the data transfer part, wherein the data transfer part is configured to put the thread into a sleep state based on the data arrival schedule information delivered from the sleep control manager and cause a timer to expire immediately before an arrival of data to perform cancellation of the sleep state, causing the thread to wake up.

Advantageous Effects of the Invention

According to the present invention, it is possible to aim for saving power by lowering the CPU usage rate, while maintaining low latency.

DESCRIPTION OF EMBODIMENTS

Hereinafter, an on-server data transmission system and the like in a mode for carrying out the present invention (hereinafter, referred to as "the present embodiment") will be described with reference to the drawings.

First Embodiment

[Overall Configuration]

Figure 1:
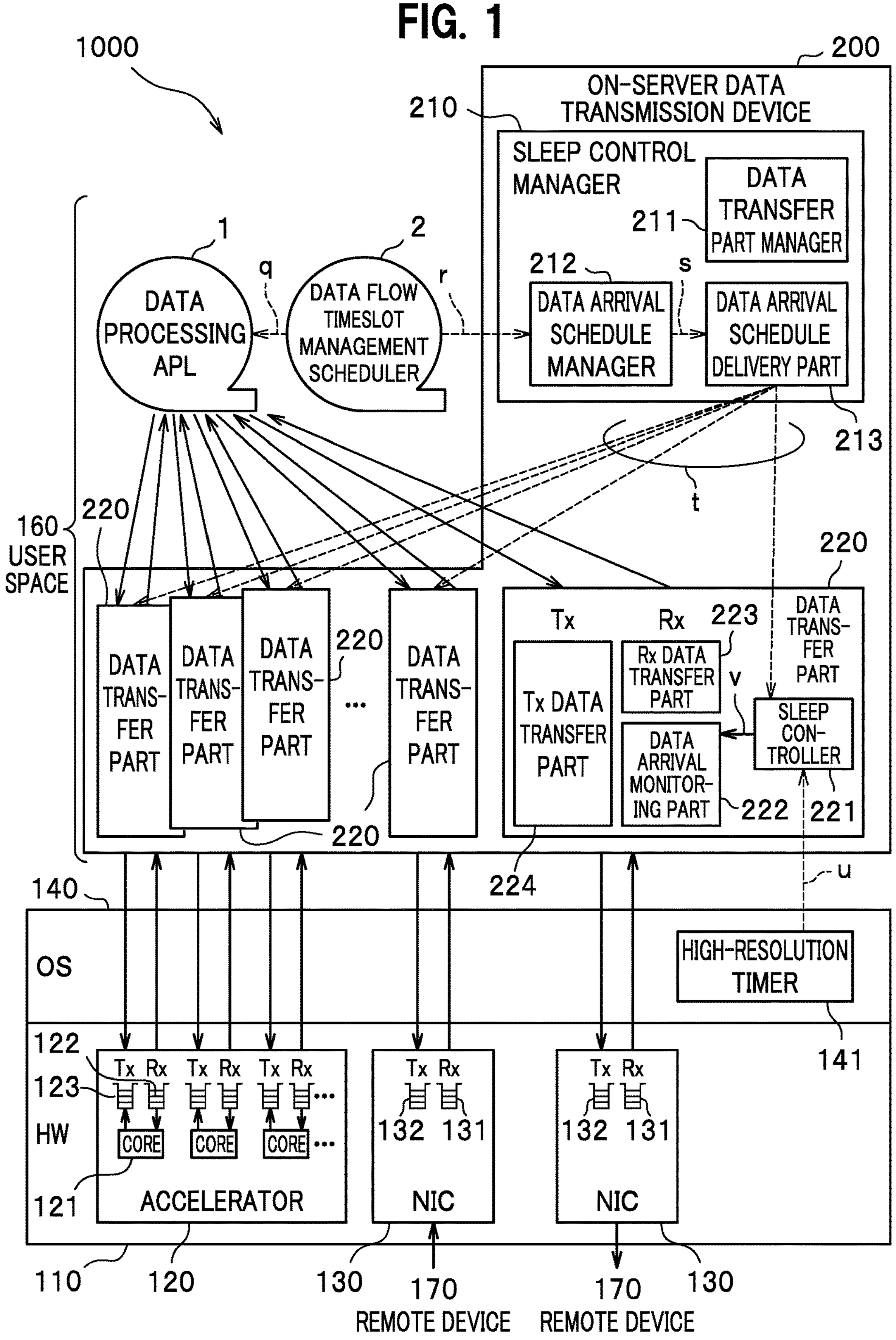
FIG. 1 is a schematic configuration diagram of an on-server data transmission system according to a first embodiment of the present invention.
Figure 25:
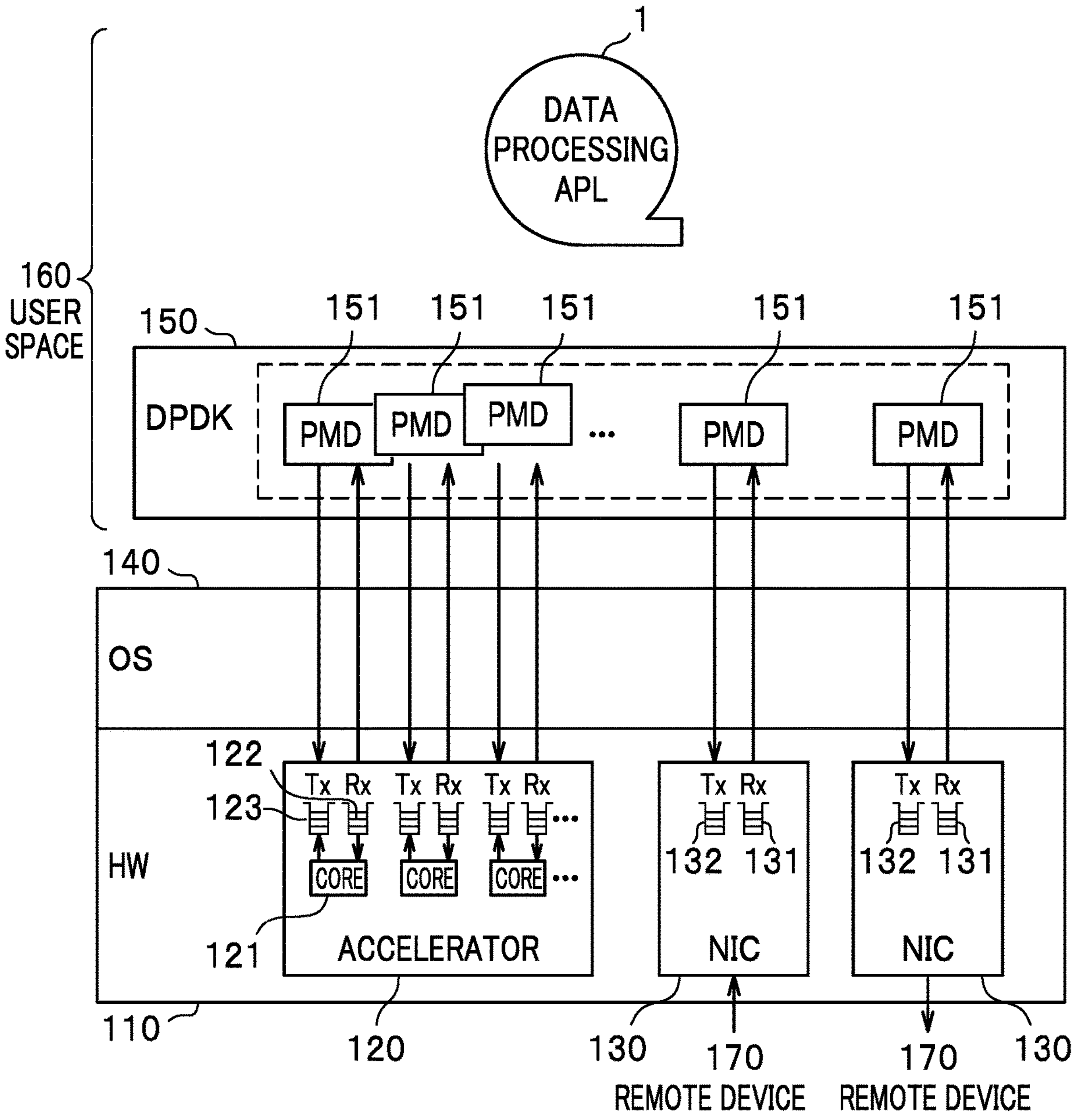
FIG. 25 is a diagram illustrating the configuration of a DPDK system that controls HW including an accelerator.

FIG. 1 is a schematic configuration diagram of an on-server data transmission system according to a first embodiment of the present invention. The same components as those in FIG. 25 are denoted by the same reference signs as those in FIG. 25.

As illustrated in FIG. 1, an on-server data transmission system 1000 includes HW 110, an OS 140, and an on-server data transmission device 200, which is high-speed data transfer middleware deployed in a user space 160.

In user space 160, a data processing APL 1 and a data flow timeslot management scheduler 2 are further deployed. Data processing APL 1 is a program to be executed in user space 160. Data flow timeslot management scheduler 2 transmits (see reference sign q in FIG. 1) schedule information to data processing APL 1. Also, data flow timeslot management scheduler 2 transmits (see reference sign r in FIG. 1) data arrival schedule information to a sleep control manager 210 (described later).

HW 110 performs data transmission/reception communication with data processing APL 1. The data flow in which data processing APL 1 receives a packet from HW 110 will be hereinafter referred to as Rx-side reception, and the data flow in which data processing APL 1 transmits a packet to HW 110 will be hereinafter referred to as Tx-side transmission.

HW 110 includes an accelerator 120 and NICs 130 (physical NICs) for connecting to communication networks.

Accelerator 120 is computing unit hardware such as a GPU or an FPGA. Accelerator 120 includes a plurality of cores (core processors) 121, Rx queues 122 and Tx queues 123 that hold data in first-in-first-out list structures.

Part of the processing by data processing APL 1 is offloaded to accelerator 120, to achieve performance and power efficiency that cannot be achieved only by software (CPU processing).

NIC 130 is NIC hardware that forms a NW interface. NIC 130 includes an Rx queue 131 and a Tx queue 132 that hold data in first-in first-out list structures. NIC 130 is connected to a remote device 170 via, for example, a communication network and performs packet transmission/reception.

OS 140 is, for example, Linux (registered trademark). OS 140 includes a high-resolution timer 141 that performs timer management in greater detail than a kernel timer. High-resolution timer 141 uses hrtimer of Linux (registered trademark), for example. In hrtimer, the time at which a callback occurs can be specified with a unit called ktime_t. High-resolution timer 141 communicates the data arrival timing at the specified time to sleep controller 221 of data transfer part 220 described later (see reference sign u in FIG. 1).

[On-Server Data Transmission Device 200]

On-server data transmission device 200 is a DPDK for performing NIC control in user space 160, and specifically, is formed of high-speed data transfer middleware.

On-server data transmission device 200 includes sleep control manager 210 and data transfer parts 220.

Like a DPDK deployed in the user space 160, on-server data transmission device 200 includes PMDs 151 (drivers capable of selecting data arrival either in a polling mode or in an interrupt mode) (see FIG. 25). Each PMD 151 is a driver capable of selecting data arrival either in a polling mode or in an interrupt mode, and a dedicated thread continuously performs data arrival checking and reception processing.

<Sleep Control Manager 210>

Sleep control manager 210 manages a data arrival schedule, and performs sleep control on each data transfer part 220 in accordance with the data arrival timing.

Sleep control manager 210 collectively performs sleep/activation timing control on data transfer parts 220 (see reference sign tin FIG. 1).

Sleep control manager 210 manages data arrival schedule information and delivers the data arrival schedule information to data transfer parts 220, to perform sleep control on data transfer parts 220.

Sleep control manager 210 includes a data transfer part manager 211, a data arrival schedule manager 212, and a data arrival schedule delivery part 213.

Data transfer part manager 211 holds information such as the number and process IDs (PIDs: Process Identifications) of data transfer parts 220 as a list.

In response to a request from data arrival schedule delivery part 213, data transfer part manager 211 transmits information such as the number and process IDs of data transfer parts 220 to data transfer parts 220.

Data arrival schedule manager 212 manages data arrival schedule. Data arrival schedule manager 212 retrieves (see reference sign r in FIG. 1) the data arrival schedule information from data flow timeslot management scheduler 2.

In a case where a change is made to the data arrival schedule information, data arrival schedule manager 212 receives a notification of the change in the data arrival schedule information from data flow timeslot management scheduler 2 to detect the change in the data arrival schedule information. Alternatively, data arrival schedule manager 212 performs the detection by snooping data including the data arrival schedule information (see FIGS. 4 and 5).

Data arrival schedule manager 212 transmits (see reference sign s in FIG. 1) the data arrival schedule information to data arrival schedule delivery part 213.

Data arrival schedule delivery part 213 retrieves information such as the number of data transfer parts 220 and the process IDs of data transfer parts 220 from data transfer part manager 211.

Data arrival schedule delivery part 213 delivers the data arrival schedule information to each data transfer part 220 (see reference sign tin FIG. 1).

<Data Transfer Part 220>

Each data transfer part 220 launches a thread (polling thread) that monitors packet arrivals using a polling model.

Based on the data arrival schedule information delivered from sleep control manager 210, data transfer part 220 puts the thread into a sleep state and causes a timer to expire immediately before an arrival of data to perform cancellation of the sleep state, causing the thread to wake up. Here, data transfer part 220 cancels the sleep state of the thread with a hardware interrupt, in preparation for reception of a packet at a timing not intended by the timer. The sleep/cancellation will be described later in [Sleep/Cancellation].

Each data transfer part 220 includes a sleep controller 221, a data arrival monitoring part 222, an Rx data transfer part 223 (packet dequeuer), and a Tx data transfer part 224.

Data arrival monitoring part 222 and Rx data transfer part 223 are function parts on the Rx side, and Tx data transfer part 224 is a function part on the Tx side.

<Sleep Controller 221>

Based on the data arrival schedule information from sleep control manager 210, sleep controller 221 suspends the data arrival monitoring and performs sleep control to transition into a sleep state when there are no incoming data arrivals.

Sleep controller 221 holds the data arrival schedule information received from data arrival schedule delivery part 213.

Sleep controller 221 sets (see reference sign v in FIG. 1) a timer of the data arrival timing for data arrival monitoring part 222. That is, sleep controller 221 sets a timer so that data arrival monitoring part 222 is able to start polling immediately before data arrives. Here, sleep controller 221 may activate data arrival monitoring part 222 upon being triggered by a hardware interrupt at the expiration of a timer by a hardware clock, using hrtimers or the like that is a high-resolution timer 141 held by the Linux kernel.

Figure 2:
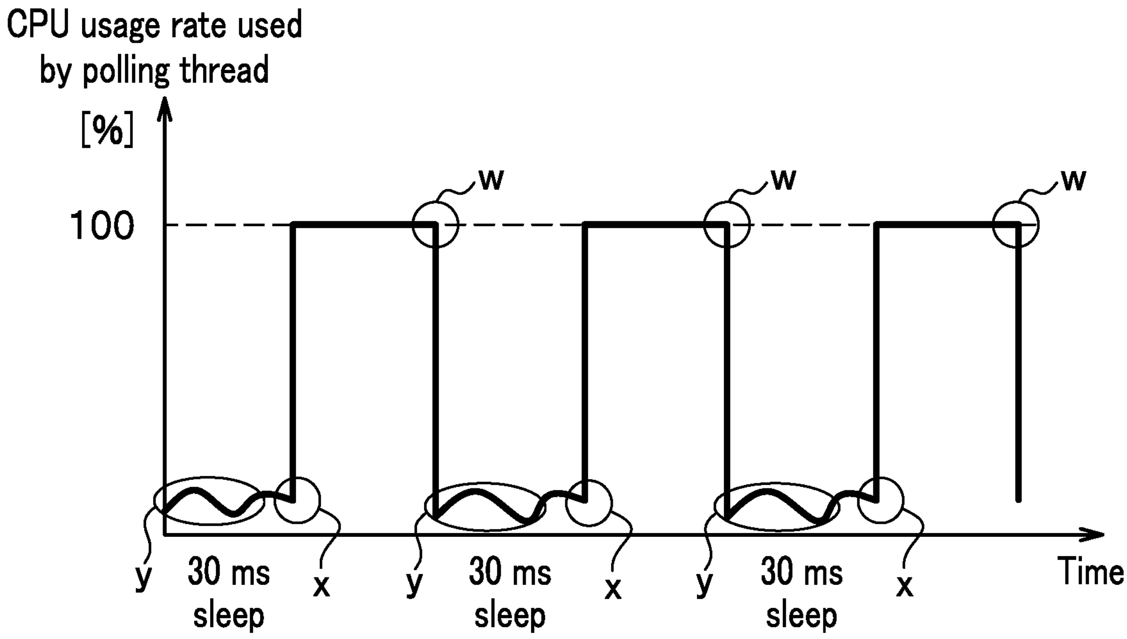
FIG. 2 is a graph illustrating an example operation of a polling thread of the on-server data transmission system according to the first embodiment of the present invention.
Figure 23:
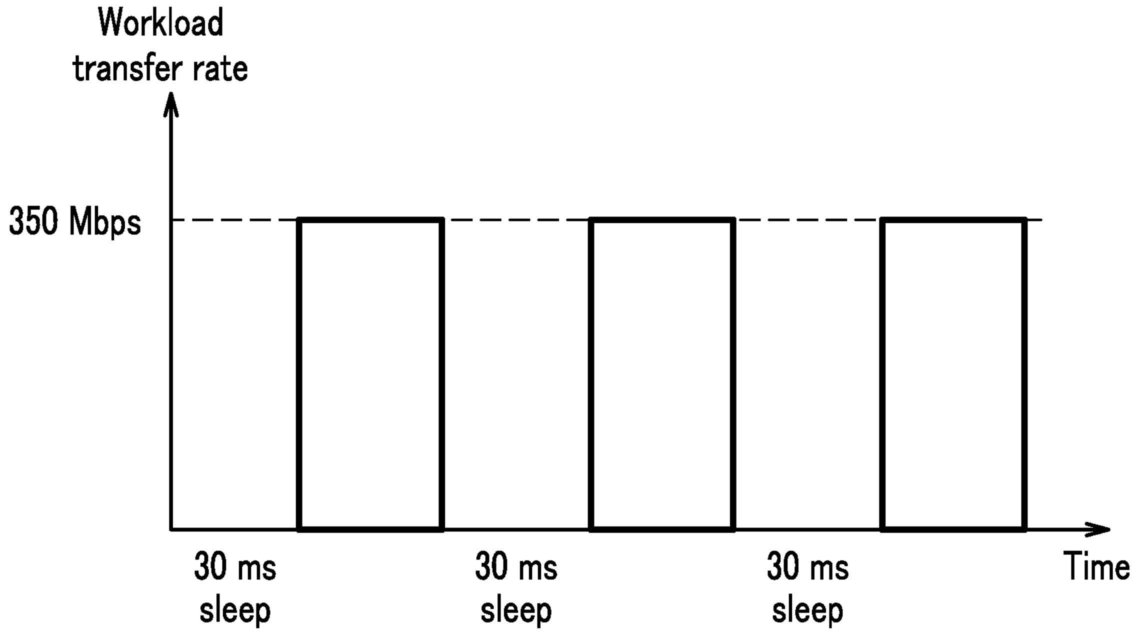
FIG. 23 is a diagram illustrating an example of transfer of video image data (30 FPS).
Figure 24:
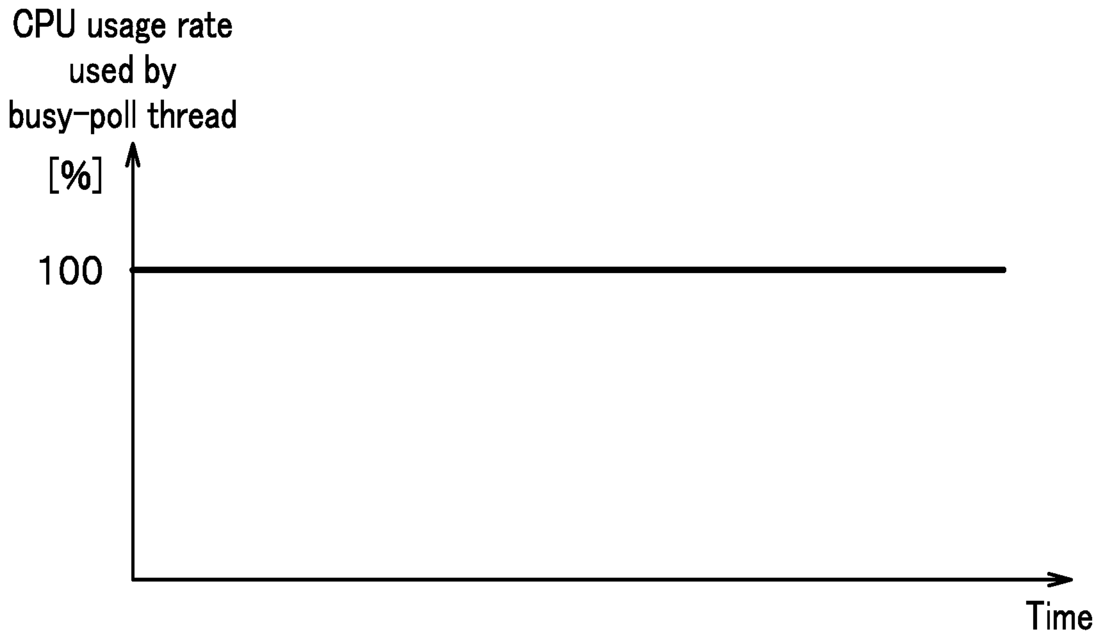
FIG. 24 is a diagram illustrating the CPU usage rate that is used by a busy-poll thread in KBP described in Non-Patent Literature 3.

FIG. 2 is a graph illustrating an example operation of the polling thread of on-server data transmission device 200. The ordinate axis indicates the CPU usage rate [%] of the CPU core used by the polling thread, and the abscissa axis indicates time. Note that FIG. 2 illustrates an example of polling thread's operation in response to packet arrivals corresponding to the example of the data transfer of the video image data (30 FPS) whose packets are to be intermittently received as illustrated in FIG. 23.

As illustrated in FIG. 2, based on the data arrival schedule information received from sleep control manager 210, data transfer part 220 puts the thread (polling thread) into a sleep state (see reference sign w in FIG. 2), and performs sleep cancellation through a hardware interrupt (hardIRQ) when the sleep is to be canceled (see reference sign x in FIG. 2). Note that reference sign y in FIG. 2 indicates fluctuations of the wiring voltage due to core CPU (Core processor) congestion or the like.

<Rx Side>

Data arrival monitoring part 222 is activated immediately before data arrives, in accordance with the data arrival schedule information managed by sleep controller 221.

Data arrival monitoring part 222 monitors Rx queue 122 or 131 of accelerator 120 or NIC 130, and checks whether data has arrived.

Figure 22:
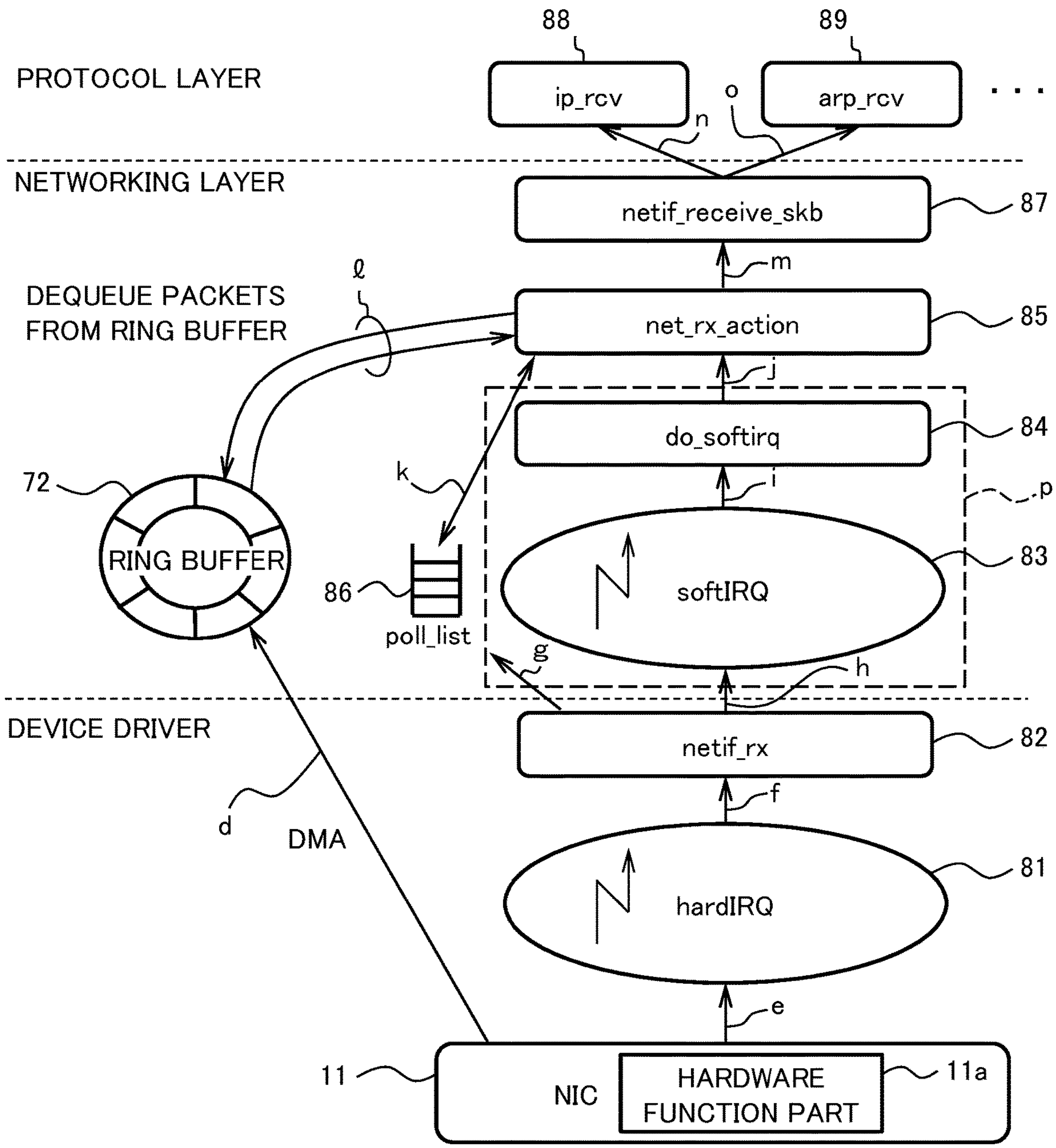
FIG. 22 is an explanatory diagram illustrating an outline of Rx-side packet processing by New API (NAPI) at the part surrounded by the dashed line in FIG. 21.

Data arrival monitoring part 222 occupies the CPU core regardless of whether data has arrived and monitors whether data has arrived by polling. If an interrupt model is used here, the delay mentioned in relation to the conventional technique illustrated in FIG. 22 occurs (that is, when a softIRQ contends with another softIRQ, a wait occurs for execution of the softIRQ, and a NW delay in the order of milliseconds due to the wait occurs). This embodiment is characterized in performing sleep control in the polling model on the Rx side.

In a case where data has arrived in Rx queue 122 or 131, data arrival monitoring part 222 performs a dequeuing operation on the queues stored in Rx queue 122 or 131 (referencing the content of a packet pooled in a buffer and, processing to be performed on the packet, taking into account the processing to be performed next, removing the corresponding queue entry from the buffer), and transfers the data to Rx data transfer part 223.

Rx data transfer part 223 transfers the received data to data processing APL 1. Like Tx data transfer part 224, Rx data transfer part 223 operates only when data arrives, and accordingly, does not unnecessarily use the CPU.

<Tx Side>

Tx data transfer part 224 stores received data into Tx queue 123 of accelerator 120 or Tx queue 132 of NIC 130.

Tx data transfer part 224 is activated by inter-process communication when data processing APL 1 sends data and returns to a CPU idle state when the data transfer is completed. Accordingly, unlike data arrival monitoring part 222, Tx data transfer part 224 does not unnecessarily use the CPU.

[Sleep/Cancellation]

Data transfer part 220 puts the thread into a sleep state based on the data arrival schedule information received from sleep controller 221, and cancels the sleep state upon being triggered by a timer.

<Normal Time>

Based on the scheduling information about the data arrival timing (data arrival schedule information), data transfer part 220 causes the timer to expire immediately before an arrival of data and wakes up the data arrival monitoring part thread of data transfer part 220. For example, using the Linux kernel standard function hr_timer, a hardware interrupt of the timer is activated when the timer expires, and data arrival monitoring part 222 wakes up the thread.

<Unexpected Case (Where Data Arrives at Unscheduled Timing)>

In a case where data arrives at an unscheduled timing, the thread of data arrival monitoring part 222 is in a sleep state. Also, there is no timer expiration which is expected in the normal case. In view of this, a hardware interrupt notifying of the packet arrival is to be activated when a packet arrives.

As described above, as packets are constantly monitored in a polling mode in the normal time, the hardware interrupt is not necessary and thus the function of the hardware interrupt is halted by the driver (PMD).

However, when causing the polling thread to sleep, assuming a case where data arrives at an unscheduled time, the mode is changed so that a hardware interrupt would be raised when a packet arrives. By doing so, a hardware interrupt will be raised when a packet arrives, and it is possible to cause data arrival monitoring part 222 to wake up the thread in the hardware interrupt handler of the hardware interrupt.

[Examples of Acquisition of Data Arrival Schedule Information]

Examples of acquisition of data arrival schedule information in the on-server data transmission system according to this embodiment are now described.

Examples of data flows in which the data arrival schedule has been determined include signal processing in a radio access network (RAN). In the signal processing in a RAN, the MAC scheduler of a MAC 4 (described later) manages timing of arrival of data in time division multiplexing.

Signal processing with a virtual RAN (vRAN) or a virtual distributed unit (vDU) often uses DPDK for high-speed data transfer. Applying the method of the invention, the sleep control on the data transfer part (DPDK, PMD, and the like) is performed in accordance with the data arrival timing managed by the MAC scheduler.

Figure 4:
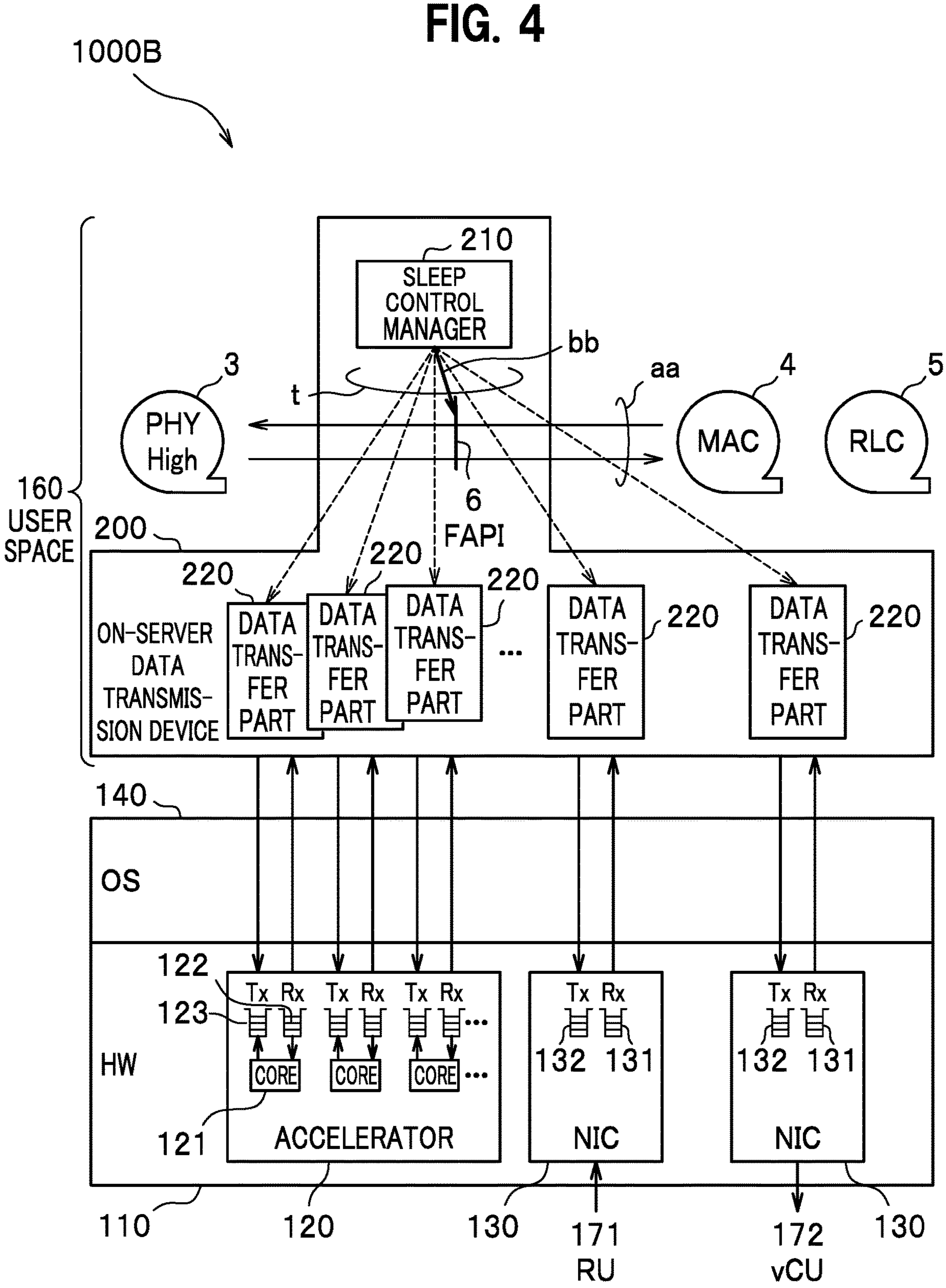
FIG. 4 is a schematic configuration diagram of an on-server data transmission system as Acquisition Example 2 in the on-server data transmission system according to the first embodiment of the present invention.
Figure 5:
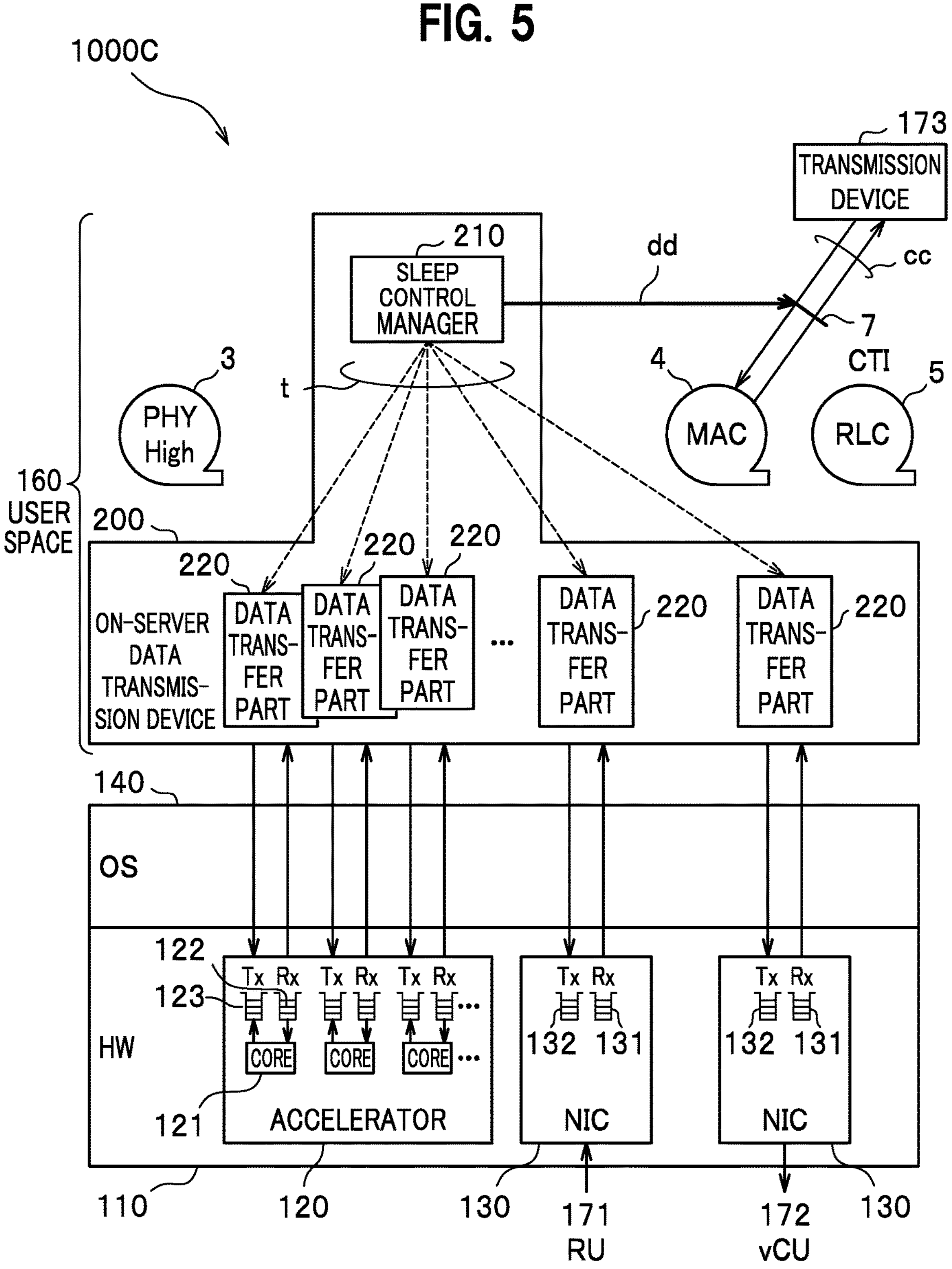
FIG. 5 is a schematic configuration diagram of an on-server data transmission system as Acquisition Example 3 in the on-server data transmission system according to the first embodiment of the present invention.

Examples of the method of acquiring the data arrival timing managed by the MAC scheduler include <Acquisition of Data Arrival Schedule Information from MAC Scheduler> (direct acquisition from the MAC scheduler) (see FIG. 3), <Acquisition of Data Arrival Schedule Information by Snooping FAPI P7> (acquisition by snooping FAPI P7 IF) (see FIG. 4), and <Acquisition of Data Arrival Schedule Information by Snooping CTI> (acquisition by snooping O-RAN CTI) (see FIG. 5). These methods will be described below in order.

<Acquisition of Data Arrival Schedule Information from MAC Scheduler>

Figure 3:
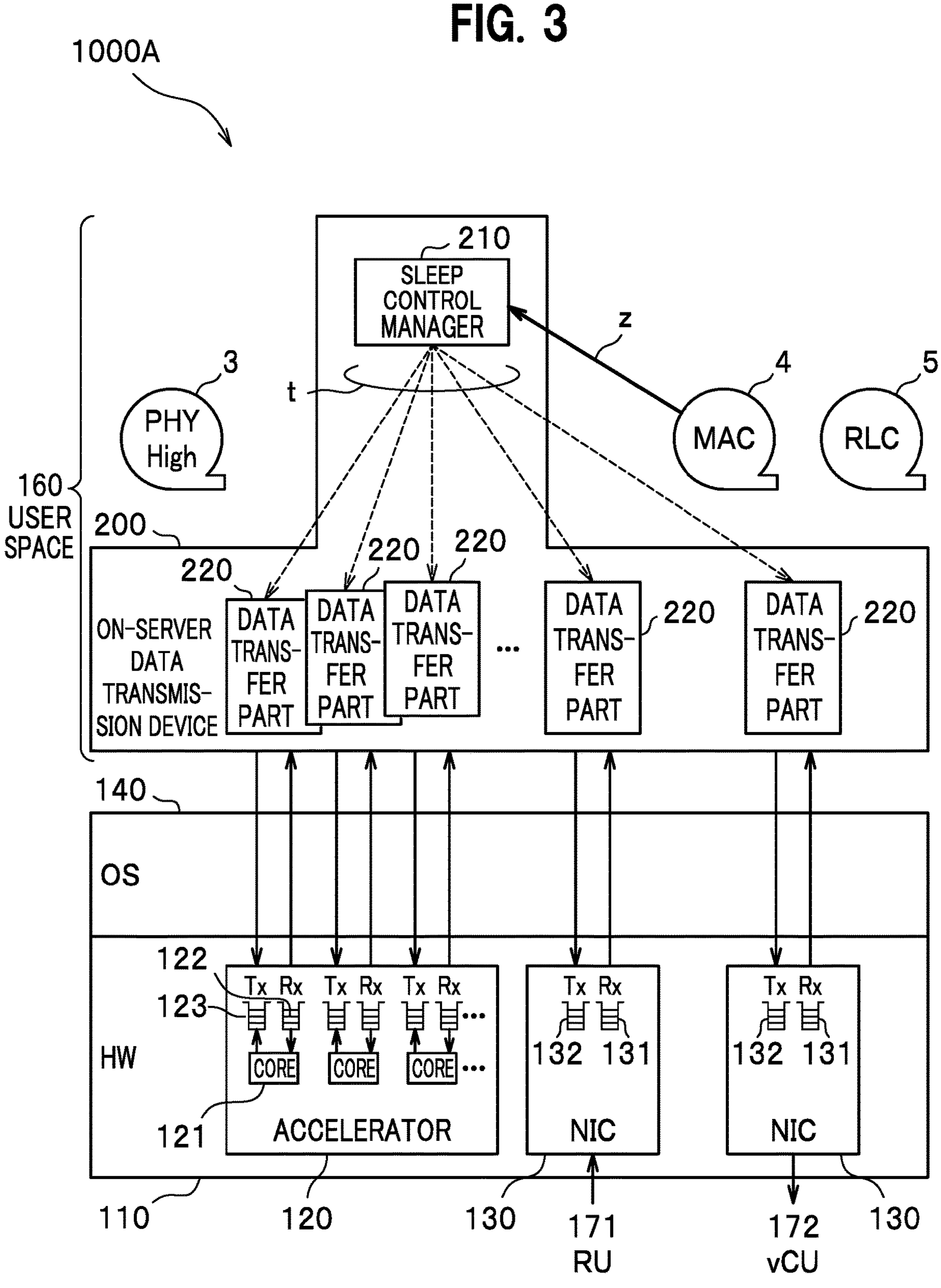
FIG. 3 is a schematic configuration diagram of the on-server data transmission system in Acquisition Example 1 in the on-server data transmission system according to the first embodiment of the present invention.

FIG. 3 is a schematic configuration diagram of an on-server data transmission system in Acquisition Example 1. Acquisition Example 1 is an example applied to a vDU system. The same components as those in FIG. 1 are denoted by the same reference signs as those used in FIG. 1, and descriptions of overlapping portions are omitted.

As illustrated in FIG. 3, in an on-server data transmission system 1000A in Acquisition Example 1, a PHY (High) (PHYsical) 3, a medium access control (MAC) 4, and a radio link control (RLC) 5 are further deployed in user space 160.

As remote devices connected to NICs 130, a radio unit (RU) 171 is connected to the reception side of a NIC 130, and a vCU 172 is connected to the transmission side of a NIC 130.

Sleep control manager 210 of on-server data transmission system 1000A acquires (see reference sign z in FIG. 3) data arrival schedule information from MAC 4, whose MAC scheduler has been modified.

Although an example applied to a vDU system has been described, the application may be made not only to a vDU but also to a vRAN system such as a vCU.

<Acquisition of Data Arrival Schedule Information by Snooping CTI>

FIG. 4 is a schematic configuration diagram of an on-server data transmission system of Acquisition Example 2. Acquisition Example 2 is an example of application made to a vCU system. The same components as those in FIG. 3 are denoted by the same reference signs as those in FIG. 3, and descriptions of overlapping portions are omitted.

As illustrated in FIG. 4, in an on-server data transmission system 1000B in Acquisition Example 2, an FAPI (FAPI P7) 6 is further deployed between PHY (High) 3 and MAC 4 in user space 160. Although FAPI 6 is drawn in on-server data transmission device 200 for the sake of illustration, FAPI 6 is deployed outside on-server data transmission device 200.

FAPI 6 is an interface (IF) that is specified by Small Cell Forum (SCF) and that connects PHY (high) 3 and MAC 4 and exchanges data schedule information (see reference sign aa in FIG. 4).

Sleep control manager 210 of on-server data transmission system 1000B snoops FAPI 6 to acquire data arrival schedule information (see reference sign bb in FIG. 4).

<Acquisition of Data Arrival Schedule Information by Snooping CTI 7>

FIG. 5 is a schematic configuration diagram of an on-server data transmission system in Acquisition Example 3. Acquisition Example 3 is an example of application made to a vCU system. The same components as those in FIG. 3 are denoted by the same reference signs as those in FIG. 3, and descriptions of overlapping portions are omitted.

As illustrated in FIG. 5, in an on-server data transmission system 1000C in Acquisition Example 3, a transmission device 173 is deployed outside user space 160.

Transmission device 173 is a transmission device defined by the O-RAN community.

MAC 4 and transmission device 173 in user space 160 are connected via a collaborative transport interface (CTI) 7. CTI 7 is an IF specified by the O-RAN community for exchanging data schedule information and the like with a transmission device (see reference sign cc in FIG. 5).

Sleep control manager 210 of on-server data transmission system 1000C snoops CTI 7 to acquire data arrival schedule information (see reference sign dd in FIG. 5).

In the description below, operations of an on-server data transmission system are described.

As the basic operations of on-server data transmission systems 1000 (see FIG. 1), 1000A (see FIG. 3), 1000B (see FIG. 4), and 1000C (see FIG. 5) are the same, operations of on-server data transmission system 1000 (see FIG. 1) are now described.

[Operation of Sleep Control Manager 210]

<Case Where a Change Has Been Made to Data Arrival Schedule Information>

Figure 6:
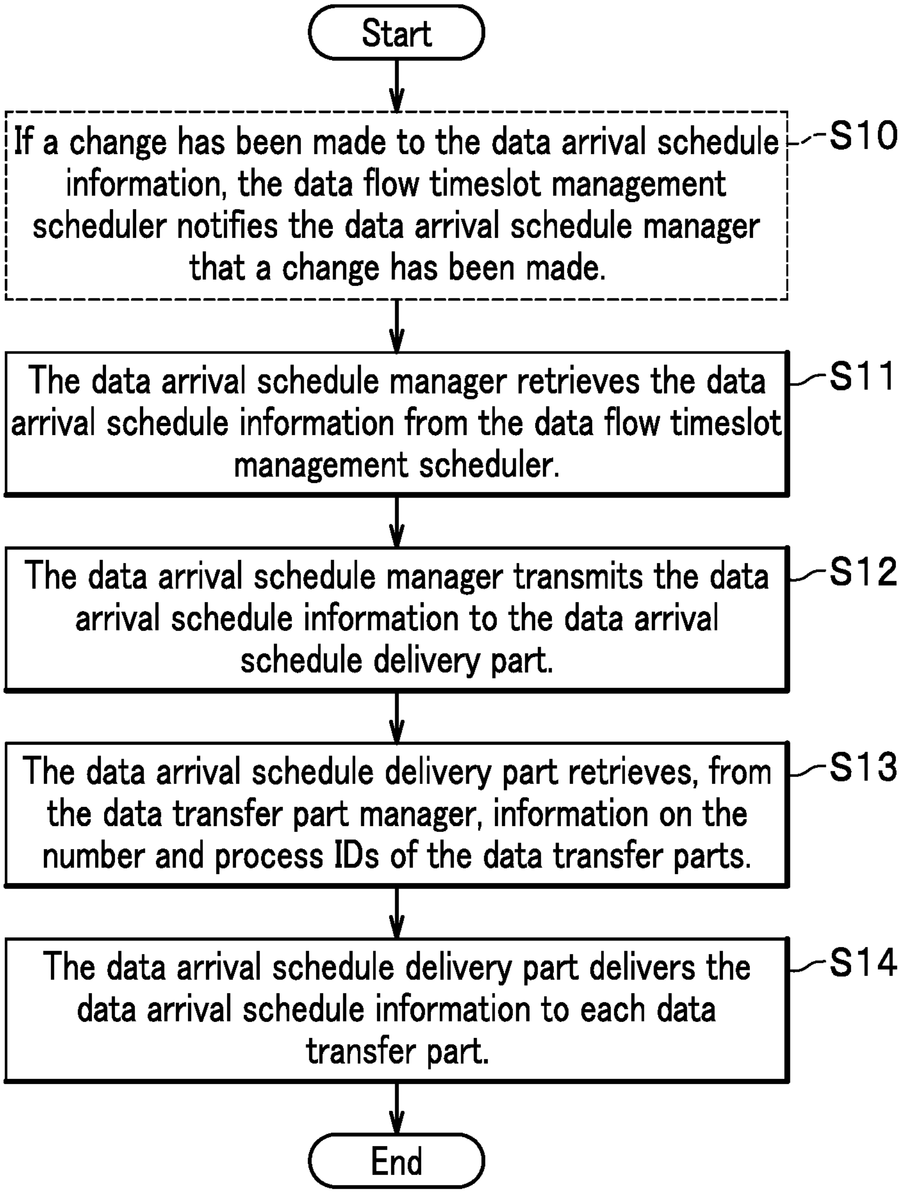
FIG. 6 is a flowchart illustrating an operation of a sleep control manager in a case where a change has been made to data arrival schedule information in the on-server data transmission system according to the first embodiment of the present invention.

FIG. 6 is a flowchart illustrating an operation to be performed by sleep control manager 210 in a case where a change has been made to the data arrival schedule information.

Step S10 surrounded by the dashed line in FIG. 6 represents an external factor of the start of the operation of sleep control manager 210 (hereinafter, in this specification, a dashed-line box in a flowchart indicates an external factor of starting an operation).

In step S10 [external factor], if a change has been made to the data arrival schedule information, data flow timeslot management scheduler 2 (see FIG. 1) notifies data arrival schedule manager 212 in sleep control manager 210 that a change has been made (see reference sign r in FIG. 1). Alternatively, as illustrated in FIGS. 4 and 5, data arrival schedule manager 212 (see FIG. 1) of sleep control manager 210 detects the change by snooping the data including the data arrival schedule information.

In step S11, data arrival schedule manager 212 (see FIG. 1) of sleep control manager 210 retrieves data arrival schedule information from data flow timeslot management scheduler 2 (see FIG. 1).

In step S12, data arrival schedule manager 212 transmits the data arrival schedule information to data arrival schedule delivery part 213 (see FIG. 1).

In step S13, data arrival schedule delivery part 213 of sleep control manager 210 retrieves, from data transfer part manager 211 (see FIG. 1), information on the number and process IDs of data transfer parts 220 (see FIG. 1), and the like.

In step S14, data arrival schedule delivery part 213 delivers the data arrival schedule information to each data transfer part 220 (see FIG. 1), and finishes the processing in this flow.

<Case Where Addition/Removal of Data Transfer Part 220 Occurs>

Figure 7:
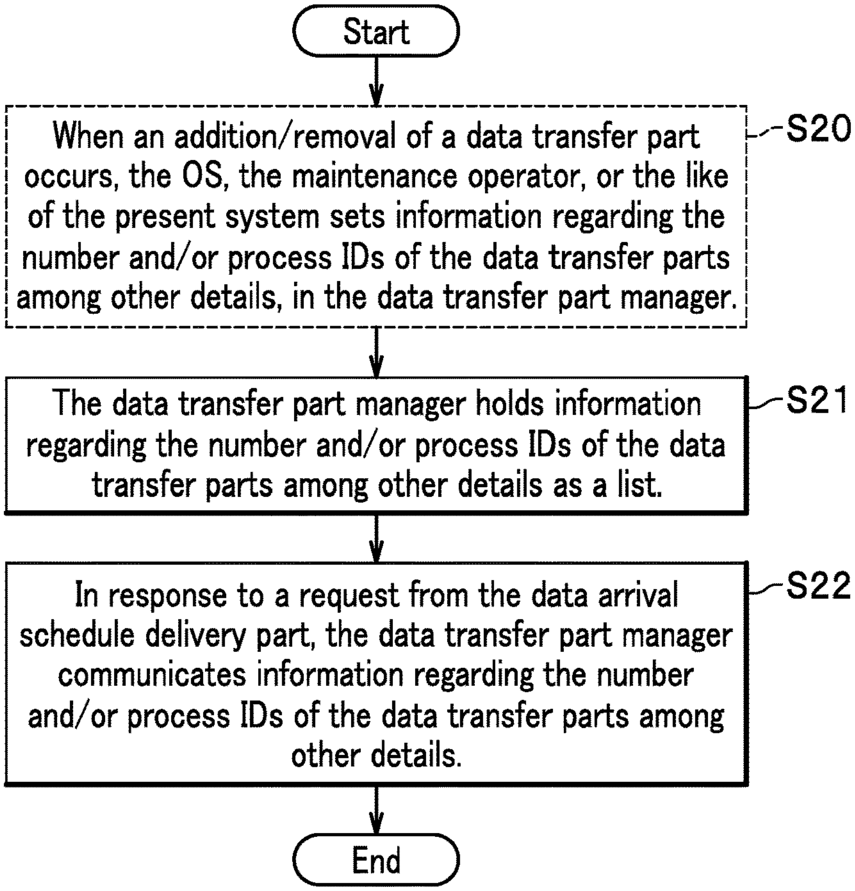
FIG. 7 is a flowchart illustrating an operation of a sleep control manager in a case where a data transfer part of an on-server data transmission system according to the first embodiment of the present invention is added/removed.

FIG. 7 is a flowchart illustrating an operation to be performed by sleep control manager 210 in a case where an addition/removal of a data transfer part 220 occurs.

In step S20 [external factor], when an addition/removal of a data transfer part 220 (see FIG. 1) occurs, the operation system, the maintenance operator, or the like of the present system sets information regarding the number and/or process IDs of the data transfer parts 220 among other details, in data transfer part manager 211 (see FIG. 1) of sleep control manager 210.

In step S21, data transfer part manager 211 of sleep control manager 210 holds information regarding the number and/or process IDs of the data transfer parts 220 among other details as a list.

In step S22, in response to a request from data arrival schedule delivery part 213, data transfer part manager 211 communicates information regarding the number and/or process IDs of the data transfer parts 220 among other details, and then finishes the processing in this flow.

Operations of sleep control manager 210 have been described. Next, an operation of data transfer part 220 is described.

[Operation of a Data Transfer Part 220]

<Sleep Control>

Figure 8:
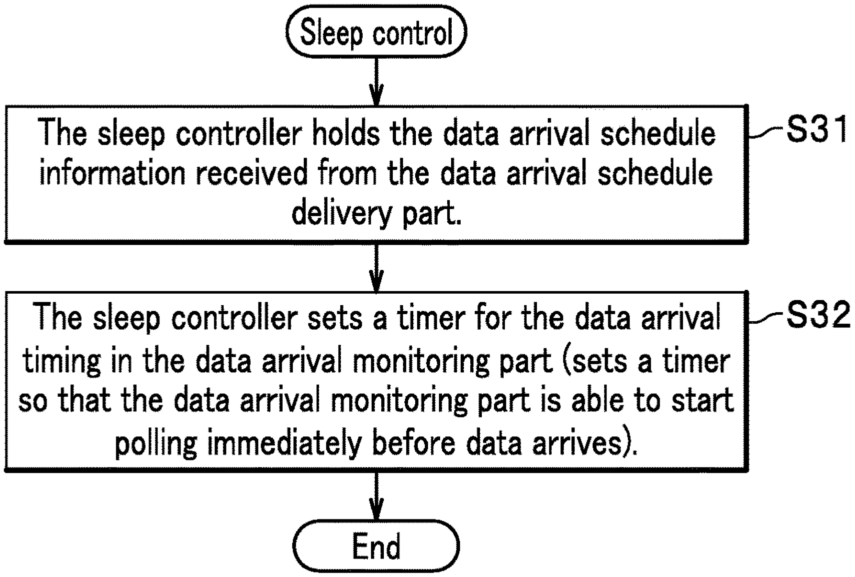
FIG. 8 is a flowchart illustrating an operation of a sleep controller of the data transfer part in an on-server data transmission system according to the first embodiment of the present invention.

FIG. 8 is a flowchart illustrating an operation of sleep controller 221 of data transfer part 220.

In step S31, sleep controller 221 (see FIG. 1) of data transfer part 220 holds the data arrival schedule information received from data arrival schedule delivery part 213 (see FIG. 1) of sleep control manager 210.

Here, a constant difference may exist between the data arrival timing managed by sleep control manager 210 (see FIG. 1) and the actual data arrival timing due to the lack of time synchronization with remote device 170 (see FIG. 1), for example. In this case, the difference from the data arrival timing may be stored in data transfer part 220, and, if the difference data is constant, sleep control manager 210 may address this by correcting the constant difference time (described later in detail with reference to FIGS. 11 and 12).

In step S32, sleep controller 221 (see FIG. 1) of data transfer part 220 sets a timer for the data arrival timing in data arrival monitoring part 222 (see FIG. 1). That is, sleep controller 221 sets a timer so that data arrival monitoring part 222 is able to start polling immediately before data arrives.

Note that, at this point of time, high-resolution timer 141 (see FIG. 1) such as hrtimers (registered trademark) included in Linux kernel may be used to activate data arrival monitoring part 222 upon being triggered by a hardware interrupt at the expiration of a timer by a hardware clock.

An operation of sleep controller 221 has been described. Next, <Rx side> and <Tx side> operations of data transfer part 220 are described. The present invention is characterized in that the <Rx side> and the <Tx side> differ in operation.

<Rx Side>

Figure 9:
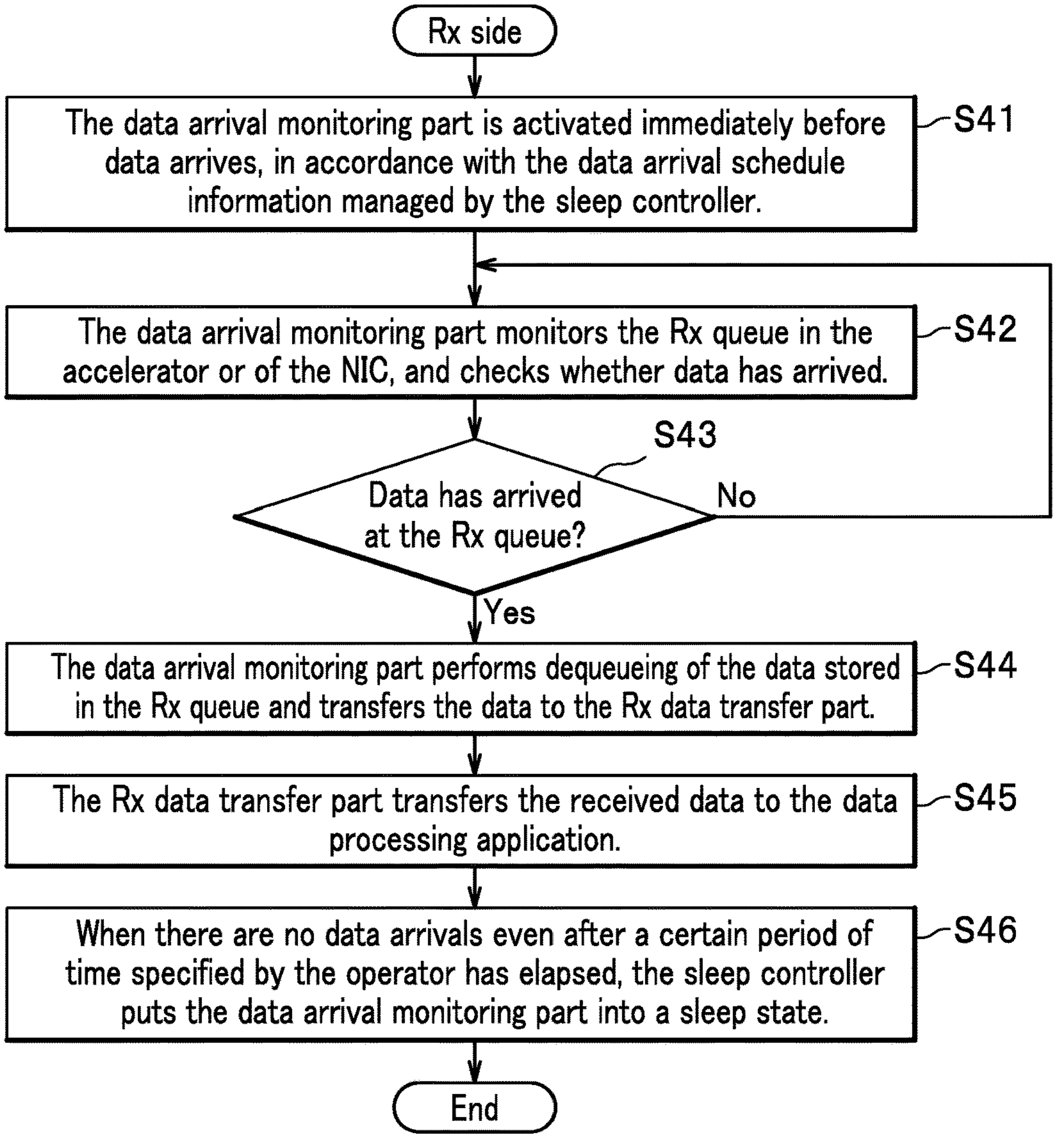
FIG. 9 is a flowchart illustrating an operation of a data arrival monitoring part of a data transfer part in an on-server data transmission system according to the first embodiment of the present invention.

FIG. 9 is a flowchart illustrating an operation of data arrival monitoring part 222 of data transfer part 220.

In step S41, data arrival monitoring part 222 (see FIG. 1) of data transfer part 220 is activated immediately before data arrives, in accordance with the data arrival schedule information managed by sleep controller 221 (see FIG. 1).

Here, when data is received from the accelerator 120 or NIC 130 (see FIG. 1) while data arrival monitoring part 222 is in a sleep state, a hardware interrupt may be activated at the time of the data reception, and data arrival monitoring part 222 may be activated in the hardware interrupt handler of this hardware interrupt. This method is effective in handling data in a case where data arrives at a time that deviates from the data arrival schedule managed by sleep control manager 210.

In step S42, data arrival monitoring part 222 monitors Rx queue 122 or 131 (see FIG. 1) of accelerator 120 or NIC 130, and checks whether data has arrived. At this point of time, data arrival monitoring part 222 occupies the CPU core regardless of whether data has arrived and monitors whether data has arrived by polling. If an interrupt model is used here, the delay mentioned in the description of the conventional technique illustrated in FIG. 22 occurs (in other words, when a softIRQ contends with another softIRQ, a wait occurs for execution of the softIRQ and a NW delay in the order of milliseconds due to the wait occurs). This embodiment is characterized in performing sleep control in the polling model on the Rx side.

In step S43, data arrival monitoring part 222 determines whether data has arrived at Rx queue 122 or 131.

If data has arrived at Rx queue 122 or 131 (S43: Yes), in step S44, data arrival monitoring part 222 performs dequeuing of the data (queue) stored in Rx queue 122 or 131 (referencing the content of a packet pooled in a buffer and, processing to be performed on the packet, taking into account the processing to be performed next, removing the corresponding queue entry from the buffer), and transfers the data to Rx data transfer part 223 (see FIG. 1).

If no data has arrived at Rx queue 122 or 131 (S43: No), the flow returns to step S42.

In step S45, Rx data transfer part 223 transfers the received data to data processing APL 1 (see FIG. 1).

Like Tx data transfer part 224 (see FIG. 1) described later, Rx data transfer part 223 operates only when data arrives, and accordingly, does not unnecessarily use the CPU.

In step S46, when there are no data arrivals even after a certain period of time specified by the operator has elapsed, sleep control manager 210 (see FIG. 1) puts data arrival monitoring part 222 (see FIG. 1) into a sleep state, and finishes the processing in this flow.

<Tx Side>

Figure 10:
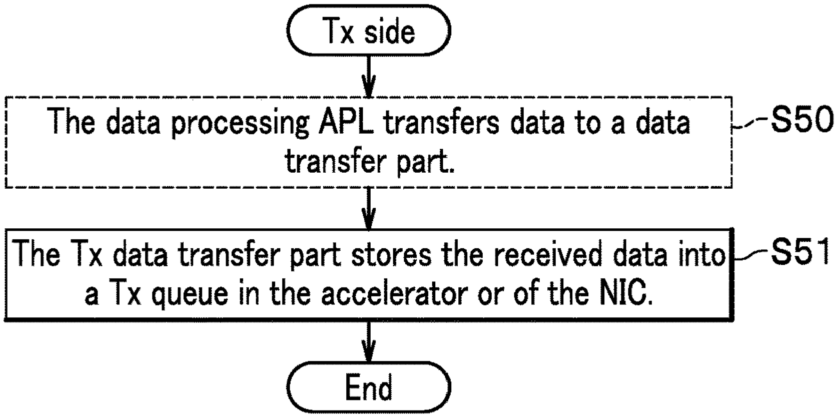
FIG. 10 is a flowchart illustrating an operation of a Tx data transfer part of a data transfer part in an on-server data transmission system according to the first embodiment of the present invention.

FIG. 10 is a flowchart illustrating an operation of Tx data transfer part 224 of data transfer part 220.

In step S50 [external factor], data processing APL 1 (see FIG. 1) transfers data to data transfer part 220 in on-server data transmission device 200 (see FIG. 1).

In step S51, Tx data transfer part 224 of data transfer part 220 stores the received data into Tx queue 123 or 132 (see FIG. 1) of accelerator 120 or NIC 130 (see FIG. 1), and finishes the processing in this flow.

Tx data transfer part 224 is activated with inter-process communication when data processing APL 1 sends data, and returns to a CPU idle state when the data transfer is completed. Accordingly, unlike data arrival monitoring part 222 on the <Rx side>, Tx data transfer part 224 does not unnecessarily use the CPU.

Operations of data transfer parts 220 have been described.

[Example of Measures to Be Taken in Case Where Difference Exists in Data Arrival Schedule]

Next, a description will be given of measures to be taken in a case where a certain time difference exists between the data arrival schedule held by sleep control manager 210 and the actual data arrival schedule. This is a supplementary explanation of step S31 in FIG. 8.

This embodiment is based on the assumption of a use case, such as RAN, where a data arrival schedule is determined in advance. As a RAN system (APL side) does not allow any data arrival whose time difference is not constant, such data arrivals are excluded from cases to be addressed.

<Case 1: Schedule of Data Transfer Part 220 Is Ahead of Actual Data Arrival>

Figure 11:
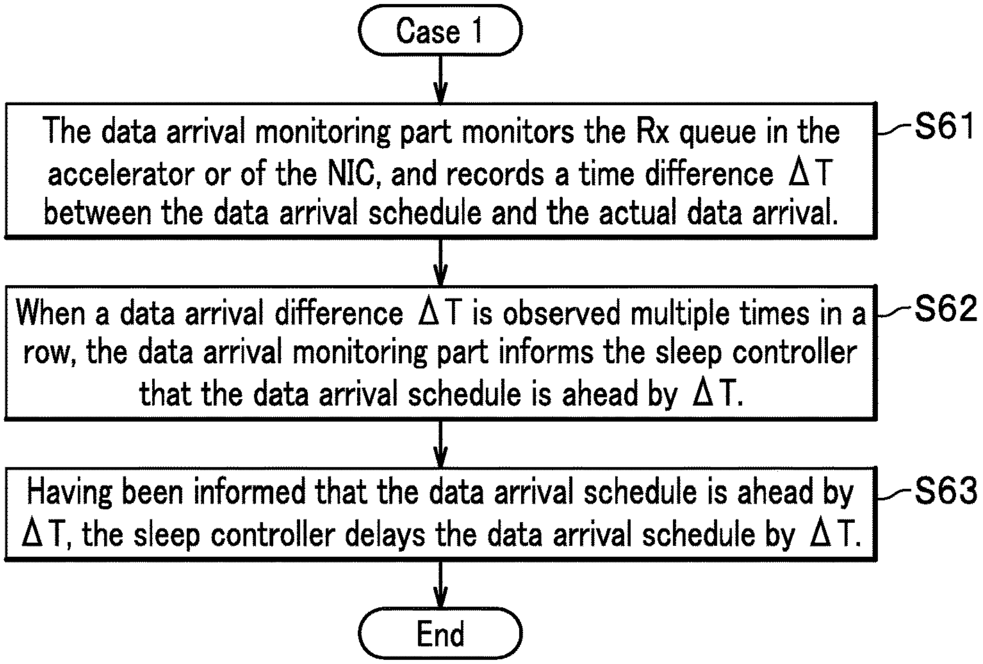
FIG. 11 is a flowchart illustrating an operation to be performed by a data transfer part in a case where there is a difference in data arrival schedule in an on-server data transmission system according to the first embodiment of the present invention.

FIG. 11 is a flowchart illustrating an operation of data transfer part 220 in a case where a difference exists in the data arrival schedule.

In step S61, data arrival monitoring part 222 (see FIG. 1) of data transfer part 220 monitors Rx queue 122 or 131 (see FIG. 1) of accelerator 120 or NIC 130, and records a time difference $\Delta T$ (a symbol representing a difference is denoted by $\Delta$) between the data arrival schedule and the actual data arrival into a memory (not illustrated).

In step S62, when a data arrival difference $\Delta T$ is observed multiple times in a row, data arrival monitoring part 222 (see FIG. 1) informs sleep controller 221 (see FIG. 1) that the data arrival schedule is ahead by $\Delta T$. The condition of multiple times in a row here is set as appropriate by the operator of the present system.

In step S63, having been informed that the data arrival schedule is ahead by $\Delta T$, sleep controller 221 (see FIG. 1) of data transfer part 220 delays the data arrival schedule by $\Delta T$, and finishes the processing in this flow. This makes it possible to correct the schedule in a case where the data arrival schedule is ahead by a certain amount of time.

<Case 2: Schedule of Data Transfer Part 220 Is Behind Actual Data Arrival>

Figure 12:
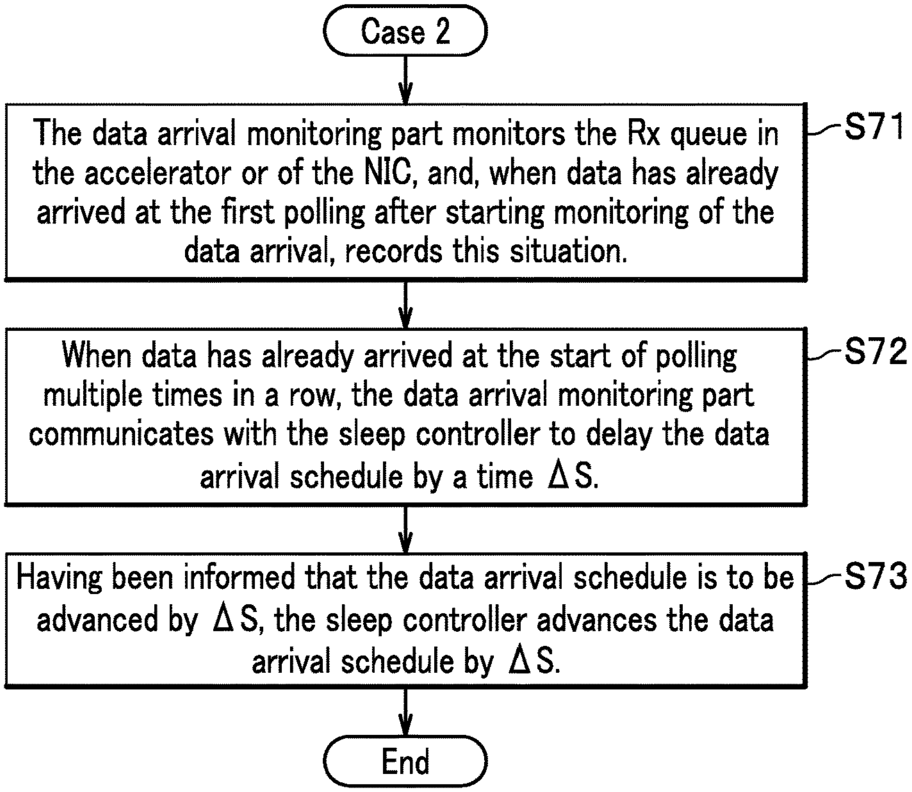
FIG. 12 is a flowchart illustrating an operation to be performed by a data transfer part in a case where there is a difference in data arrival schedule in an on-server data transmission system according to the first embodiment of the present invention.

FIG. 12 is a flowchart illustrating an operation of data transfer part 220 in a case where a difference exits in the data arrival schedule.

In step S71, data arrival monitoring part 222 (see FIG. 1) of data transfer part 220 monitors Rx queue 122 or 131 (see FIG. 1) of accelerator 120 or NIC 130, and, when data has already arrived at the first polling after starting monitoring of the data arrival, records this situation into a memory (not illustrated). This is described in greater detail. Data arrival monitoring part 222 is activated immediately before data arrives (see the processing in step S32 in FIG. 8). However, even though it is immediately before data arrives, there is a time interval Δt immediately before the data arrives, and it is assumed that idle polling is performed in several cycles. Therefore, when data has already arrived when polling has just started, it can be determined that there is a high possibility that the schedule of data transfer part 220 is behind.

In step S72, when data has already arrived at the start of polling multiple times in a row, data arrival monitoring part 222 communicates with sleep controller 221 (see FIG. 1) to delay the data arrival schedule by a minute time ΔS. As it is not possible to determine how long the data arrival schedule is actually deviated, the data arrival schedule is delayed repeatedly by the minute time ΔS set as appropriate by the operator, to gradually adjust the schedule.

In step S73, having been informed that the data arrival schedule is to be advanced by ΔS, sleep controller 221 advances the data arrival schedule by ΔS, and finishes the processing in this flow. By repeatedly performing the time correction by ΔS, it is possible to correct the schedule in a case where a delay exists in the data arrival schedule by a certain period of time.

As described above, in on-server data transmission system 1000, on-server data transmission device 200 is deployed in user space 160. Therefore, like DPDK, each data transfer part 220 of on-server data transmission device 200 is able to, while bypassing the kernel, reference a ring-structured buffer (when a packet arrives at accelerator 120 or NIC 130, the packet is stored by direct memory access (DMA) to the ring-structured buffer created in a memory space managed by DPDK). That is, on-server data transmission device 200 does not use a ring buffer (ring buffer 72) (see FIG. 22) and a poll list (ring buffer 72) (see FIG. 22) in the kernel.

Data transfer part 220 is able to instantly notice a packet arrival by the polling thread constantly monitoring the ring-structured buffer (mbuf: a ring-structured buffer to which PMD 151 copies data by DMA) created in the memory space managed by this DPDK (meaning a polling model instead of an interrupt model).

In addition to the features observed in user space 160, on-server data transmission device 200 has the following features regarding the method for waking up the polling thread.

That is, for a workload whose data arrival timing has been already determined, on-server data transmission device 200 wakes up the polling thread using a timer based on scheduling information on the data arrival timing (data arrival schedule information). Note that an on-server data transmission device 200B (see FIG. 17) according to a third embodiment described later provides a polling thread in the kernel, and wakes up the polling thread upon being triggered by a hardware interrupt from a NIC 11.

Operations of on-server data transmission device 200 are supplementarily described.

<Regular Operation: Polling Mode>

In on-server data transmission device 200, the polling thread in user space 160 monitors a ring buffer prepared in a memory space by accelerator 120 or NIC 130 (see FIG. 1). Specifically, PMDs 151 (see FIG. 25) of on-server data transmission device 200 are drivers capable of selecting data arrival either in a polling mode or in an interrupt mode, and, when data arrives at accelerator 120 or NIC 130, PMD 151 copies the data into the ring-structured buffer mbuf by DMA, as this ring-structured buffer called mbuf is present in the memory space. The polling thread in user space 160 monitors this ring-structured buffer mbuf. Therefore, on-server data transmission device 200 does not use the poll_list prepared by the kernel.

The regular operation (polling mode) has been described. Next, an operation in an unexpected interrupt mode is described.

<Unexpected Operation: Interrupt Mode>

On-server data transmission device 200 changes the mode of the drivers (PMDs 151) so that a hardware interrupt (hardIRQ) can be raised from accelerator 120 or NIC 130 (see FIG. 1) in a case where data arrives while the polling thread is in a sleep state and a hardware interrupt is activated to wake up the polling thread when data arrives at accelerator 120 or NIC 130.

In this manner, the drivers (PMDs 151) of on-server data transmission device 200 have two modes, which are the polling mode and the interrupt mode.

Second Embodiment

Figure 13:
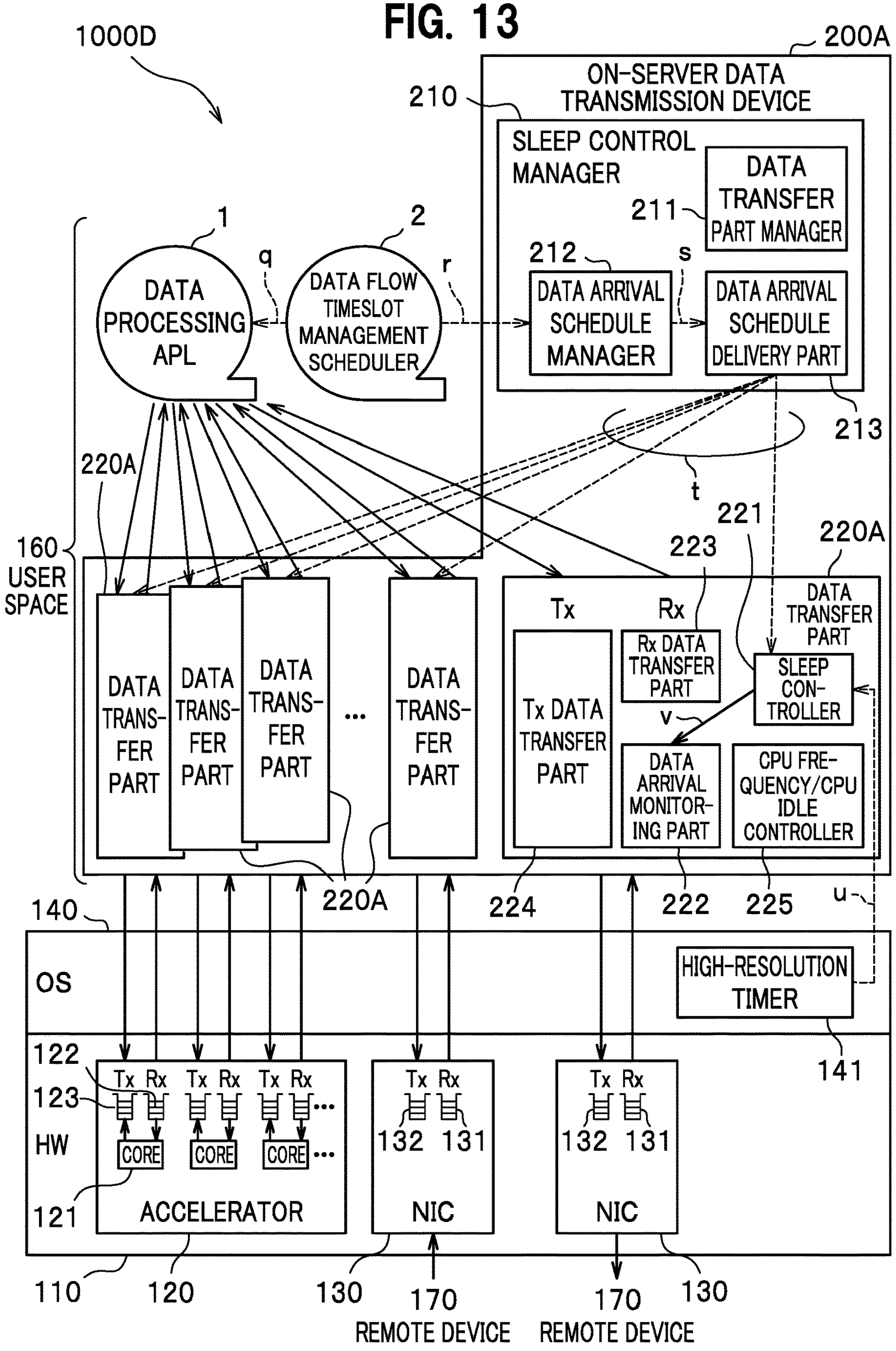
FIG. 13 is a schematic configuration diagram of an on-server data transmission system according to a second embodiment of the present invention.

FIG. 13 is a schematic configuration diagram of an on-server data transmission system according to a second embodiment of the present invention. The same components as those in FIG. 1 are denoted by the same reference signs as those used in FIG. 1, and descriptions of overlapping portions are omitted.

As illustrated in FIG. 13, an on-server data transmission system 1000D includes HW 110, OS 140, and an on-server data transmission device 200A, which is high-speed data transfer middleware deployed in user space 160.

Like on-server data transmission device 200 illustrated in FIG. 1, on-server data transmission device 200A is formed of high-speed data transfer middleware.

On-server data transmission device 200A includes sleep control manager 210 and data transfer parts 220A.

Each data transfer part 220A includes a CPU frequency/CPU idle controller 225 (CPU frequency controller or CPU idle controller) in addition to the components of data transfer part 220 illustrated in FIG. 1.

CPU frequency/CPU idle controller 225 performs control to vary the CPU operating frequency and the CPU idle setting. Specifically, CPU frequency/CPU idle controller 225 of a polling thread (on-server data transmission device 200A) activated by a hardware interrupt handler sets a lower CPU operating frequency of the CPU core used by the polling thread compared to the frequency used during normal operation.

Here, the kernel is able to change the operating frequency of the CPU core through governor setting. CPU frequency/CPU idle controller 225 is able to set a lower CPU operating frequency compared to the frequency used during normal operation, using the governor setting or the like. Note that the CPU idle setting depends on the type of the CPU. Note that, in a case where the CPU core has activated the CPU idle setting, the CPU idle setting can be canceled.

In the description below, operations of on-server data transmission system 1000D are described.

<Rx Side>

Figure 14:
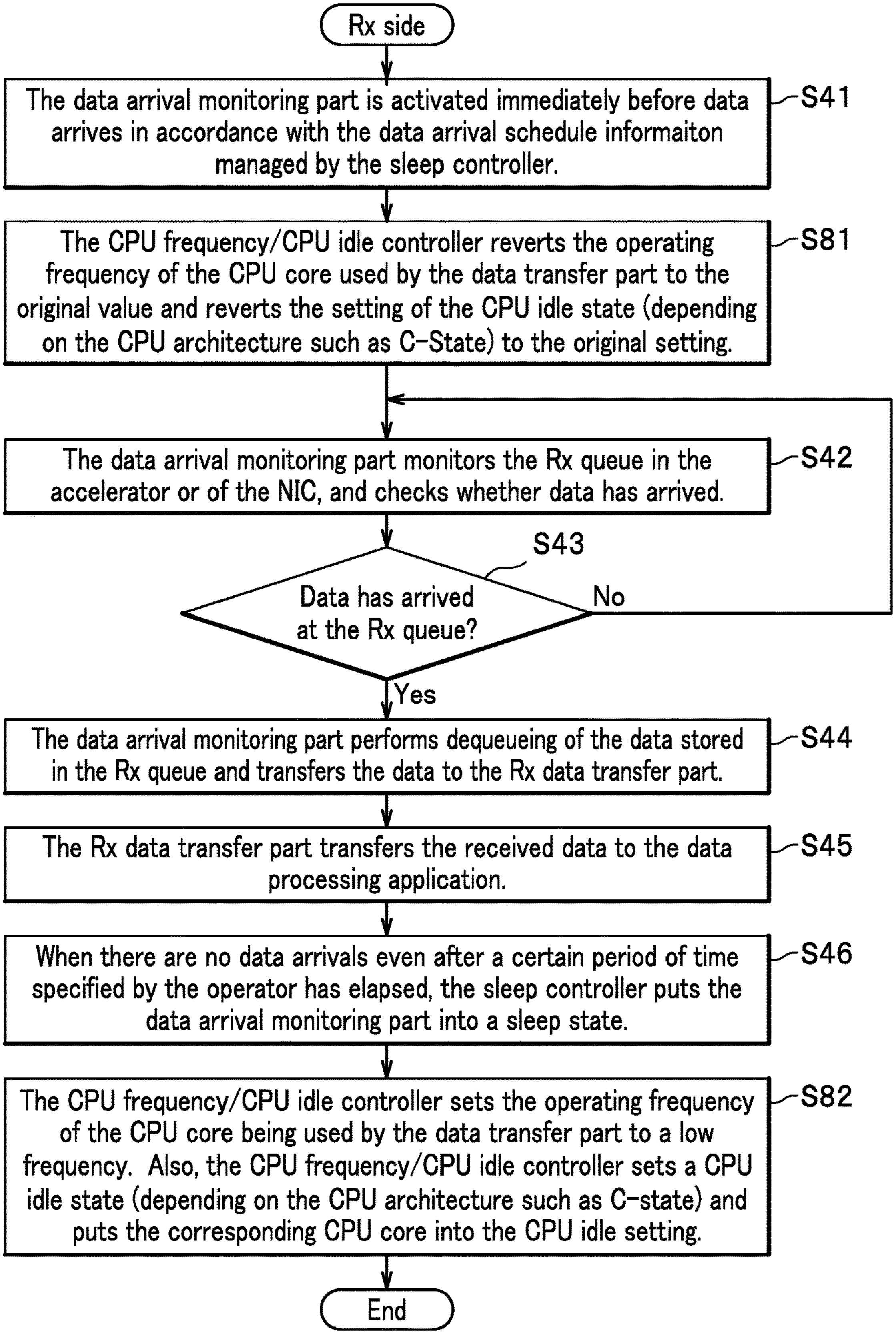
FIG. 14 is a flowchart illustrating an operation of a data arrival monitoring part of a data transfer part in an on-server data transmission system according to the second embodiment of the present invention.

FIG. 14 is a flowchart illustrating an operation of data arrival monitoring part 222 of data transfer part 220A. Portions that perform the same processing as those in the flowchart shown in FIG. 9 are denoted by the same step numbers, and explanation of the overlapping portions is omitted.

In step S41, when data arrival monitoring part 222 (see FIG. 13) is activated immediately before data arrives, then in Step S81, CPU frequency/CPU idle controller 225 (see FIG. 13) reverts the operating frequency of the CPU core used by data transfer part 220A to the original value (increases the CPU operating frequency of the CPU core). Also, CPU frequency/CPU idle controller 225 reverts the setting of the CPU idle state (depending on the CPU architecture such as C-State) to the original setting, and proceeds to step S42.

When sleep control manager 210 (see FIG. 13) puts data arrival monitoring part 222 (see FIG. 13) into a sleep state in step S46, then in step S82, CPU frequency/CPU idle controller 225 sets the operating frequency of the CPU core being used by data transfer part 220A to a low frequency. Also, CPU frequency/CPU idle controller 225 sets a CPU idle state (depending on the CPU architecture such as C-state), puts the corresponding CPU core into the CPU idle setting, and finishes the processing in this flow.

In this way, in on-server data transmission device 200A, each data transfer part 220A includes CPU frequency/CPU idle controller 225 and sets a CPU frequency/CPU idle state in conjunction with the sleep control on data arrival monitoring part 222 to achieve further power saving.

Note that the processing of lowering the CPU frequency and the processing of putting data arrival monitoring part 222 into a sleep state may be performed at the same time. In addition, data arrival monitoring part 222 may be put into a sleep state after completion of the packet transfer processing is confirmed.

Application Example

On-server data transmission devices 200 and 200A are each to be an on-server data transmission device that launches a thread that monitors packet arrivals using a polling model in a kernel, and the OS is not limited to any particular kind. Also, there is no limitation to being in a server virtualization environment. Therefore, on-server data transmission systems 1000 to 1000D can be applied to the respective configurations illustrated in FIGS. 15 and 16.

<Example of Application to VM Configuration>

Figure 15:
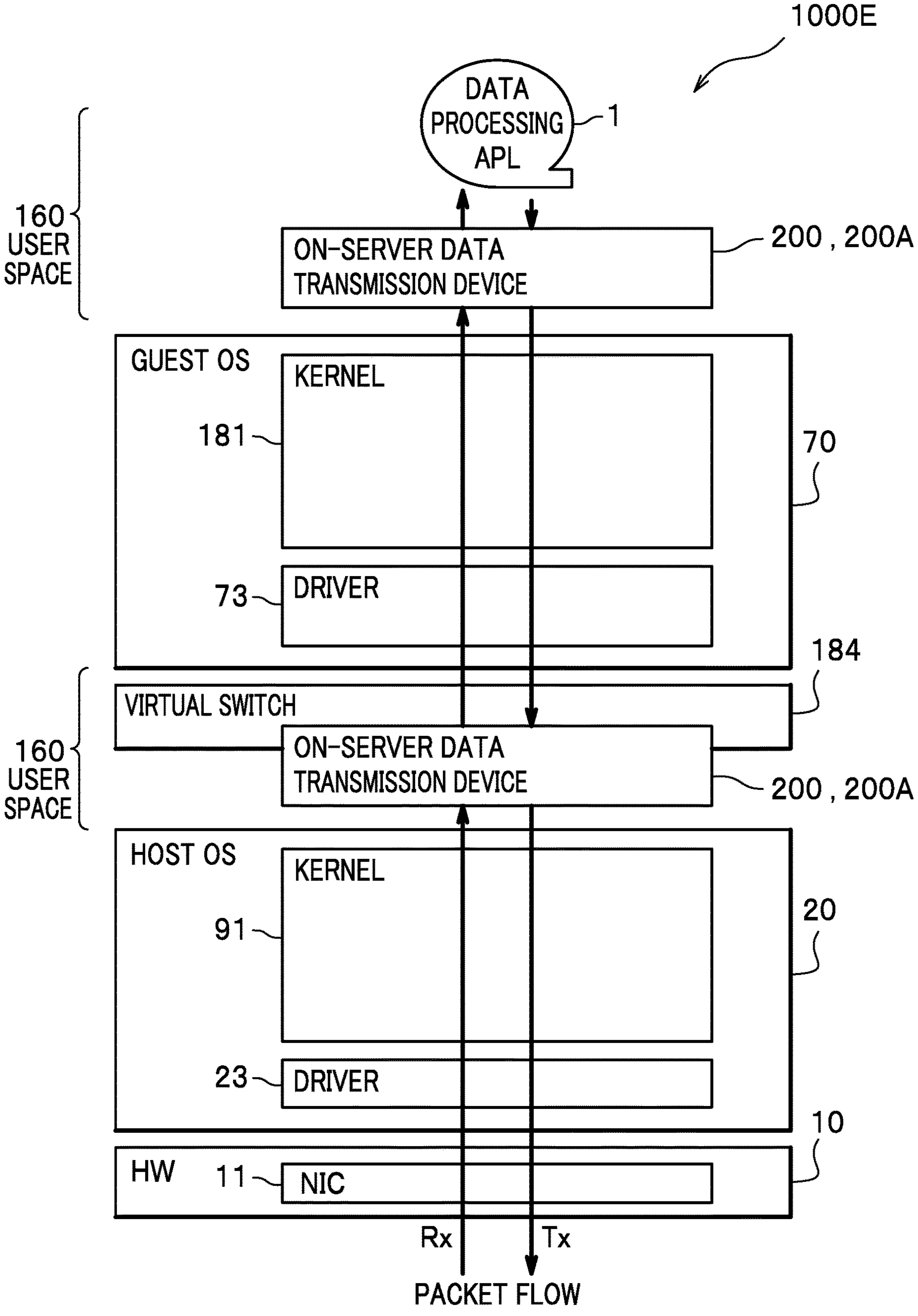
FIG. 15 is a diagram illustrating an example in which the on-server data transmission system is applied to an interrupt model in a server virtualization environment which is configured with a general-purpose Linux kernel and a VM.

FIG. 15 is a diagram illustrating an example in which an on-server data transmission system 1000E is applied to the interrupt model in a server virtualization environment which is configured with a general-purpose Linux kernel (registered trademark) and a VM. The same components as those in FIGS. 1, 13, and 19 are denoted by the same reference signs.

As illustrated in FIG. 15, on-server data transmission system 1000E includes HW 10, a Host OS 20, on-server data transmission devices 200 or 200A, which are high-speed data transfer middleware disposed in user spaces 160, a virtual switch 184, and a Guest OS 70.

Specifically, the server includes: Host OS 20, on which a virtual machine and an external process formed outside the virtual machine can operate; and Guest OS 70, which operates in the virtual machine.

Figure 19:
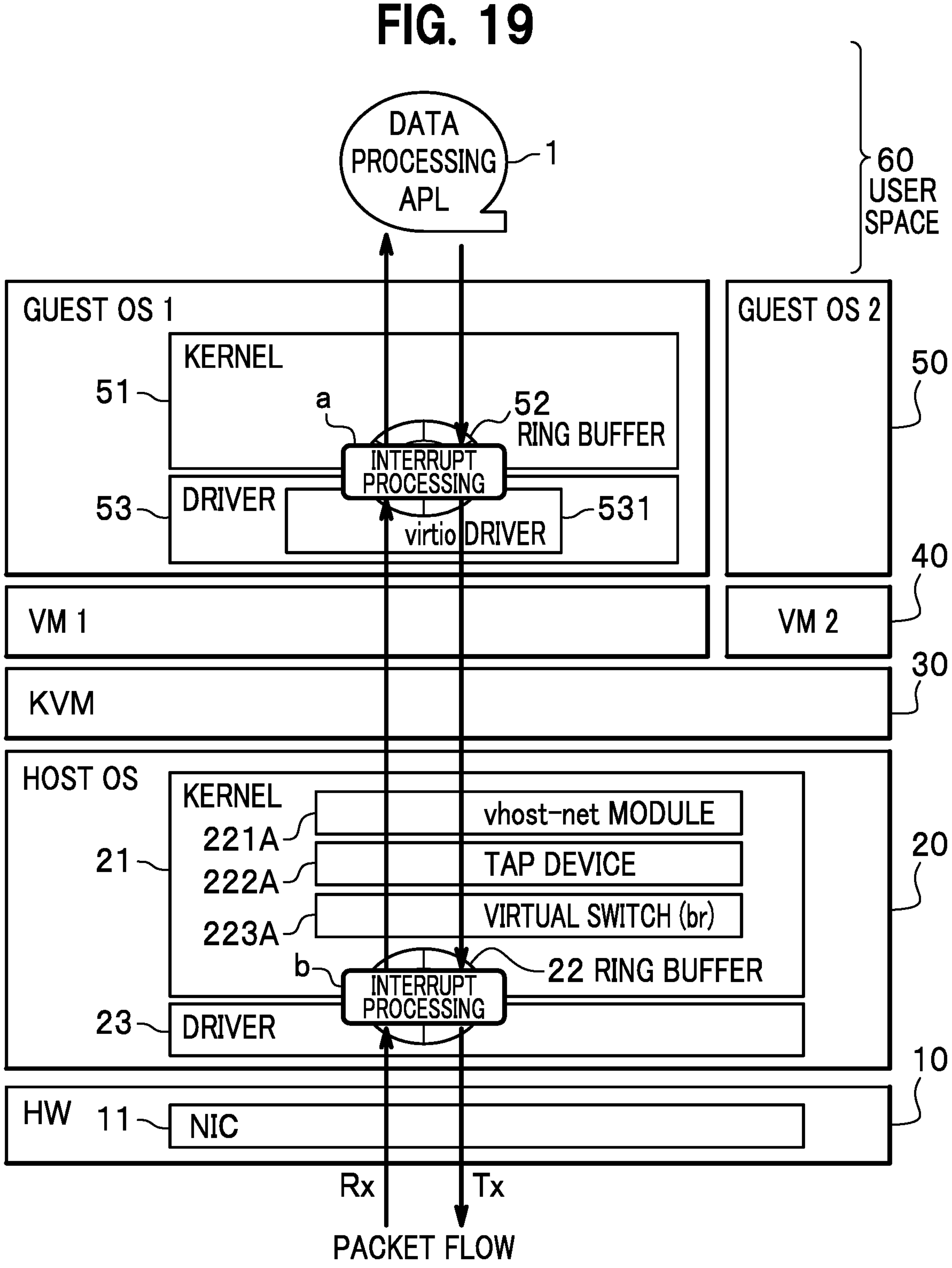
FIG. 19 is an explanatory diagram illustrating packet transfer operations performed according to an interrupt model in a server virtualization environment which is configured with a general-purpose Linux kernel and a VM.
Figure 20:
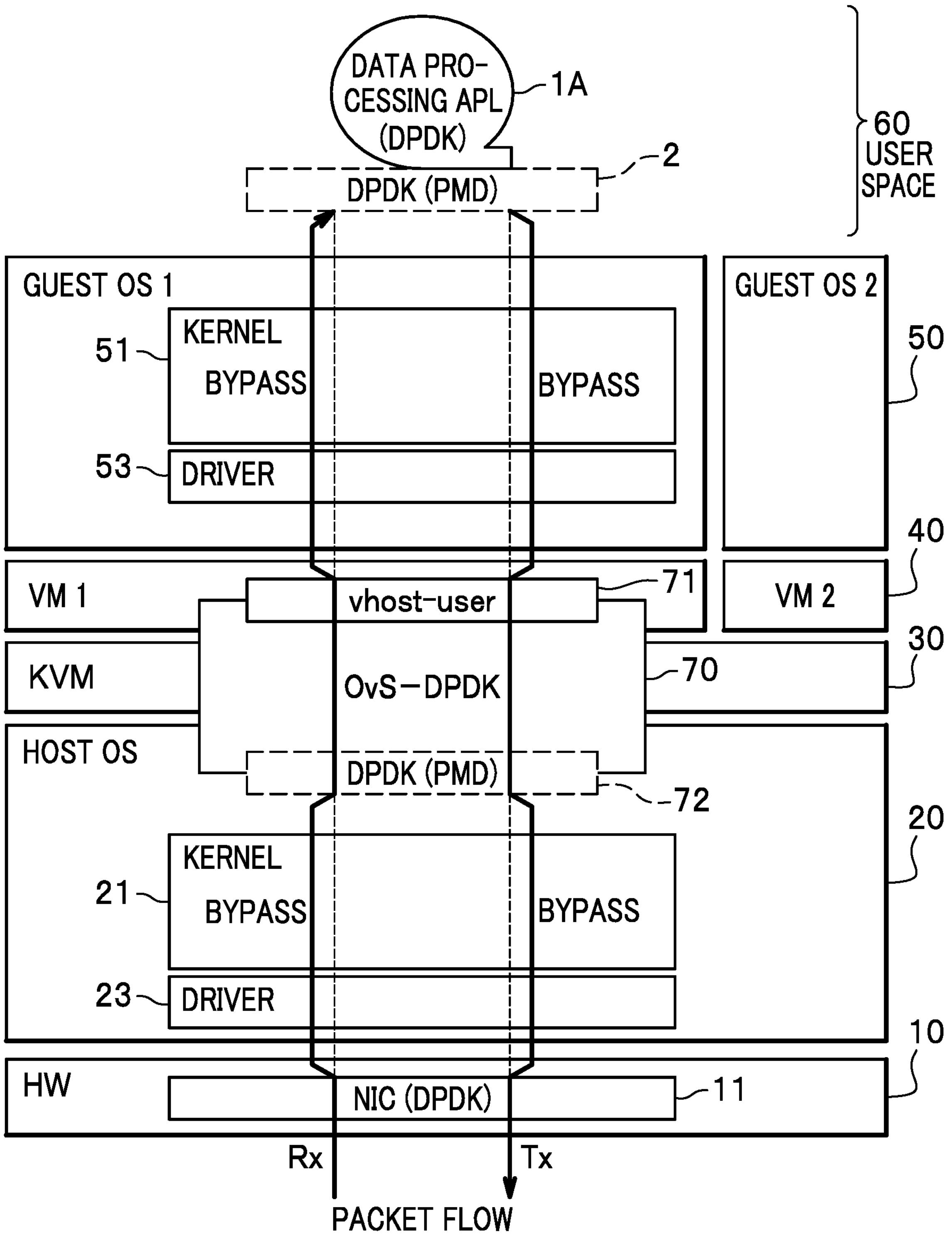
FIG. 20 is an explanatory diagram illustrating packet transfer based on a polling model in an OvS-DPDK configuration.

Host OS 20 includes: a kernel 91; a ring buffer 22 (see FIG. 19) that is managed by kernel 91, in a memory space in which the server deploys Host OS 20; a poll_list 86 (see FIG. 22), in which information on net device, indicative of which device the hardware interrupt (hardIRQ) from a NIC 11 comes from, is registered; a vhost-net module 221A (see FIG. 19), which is a kernel thread; a tap device 222A (see FIG. 19), which is a virtual interface created by kernel 91; and a virtual switch (br) 223A (see FIG. 19).

On the other hand, Guest OS 70 includes: a kernel 181; a driver 73; a ring buffer 52 (see FIG. 19) that is managed by kernel 181, in a memory space in which the server deploys Guest OS 70; a poll_list 86 (see FIG. 22), in which information on net device, indicative of which device the hardware interrupt (hardIRQ) from NIC 11 comes from, is registered;

In on-server data transmission system 1000E, on-server data transmission devices 200 or 200A are deployed in user spaces 160. Therefore, like DPDK, each data transfer part 220 of on-server data transmission devices 200 or 200A is able to reference the ring-structured buffer while bypassing the kernel. That is, on-server data transmission devices 200 or 200A do not use a ring buffer (ring buffer 72) (see FIG. 22) and a poll list (ring buffer 72) (see FIG. 22) in the kernel.

Data transfer part 220 is able to reference the ring-structured buffer (ring buffer 72) (mbuf: a ring-structured buffer to which PMD 151 copies data by DMA) while bypassing the kernel and instantly notice a packet arrival (meaning a polling model instead of an interrupt model).

In this manner, reduction of the delay is aimed for in the system having the virtual server configuration of a VM by, while bypassing the kernel, performing a packet transfer in the polling mode with a low delay in both Host OS 20 and Guest OS 70 when an arrival of data is scheduled. Further, power saving is aimed for when no data arrival is scheduled, by suspending monitoring of data arrival and by transitioning to a sleep state. As a result, it is possible to achieve both low latency and power saving by performing sleep control with timer control taking the data arrival timing into account. Furthermore, packet transfer can be performed with a shorter delay in the server, without any modification to the APL.

<Example of Application to Container Configuration>

Figure 16:
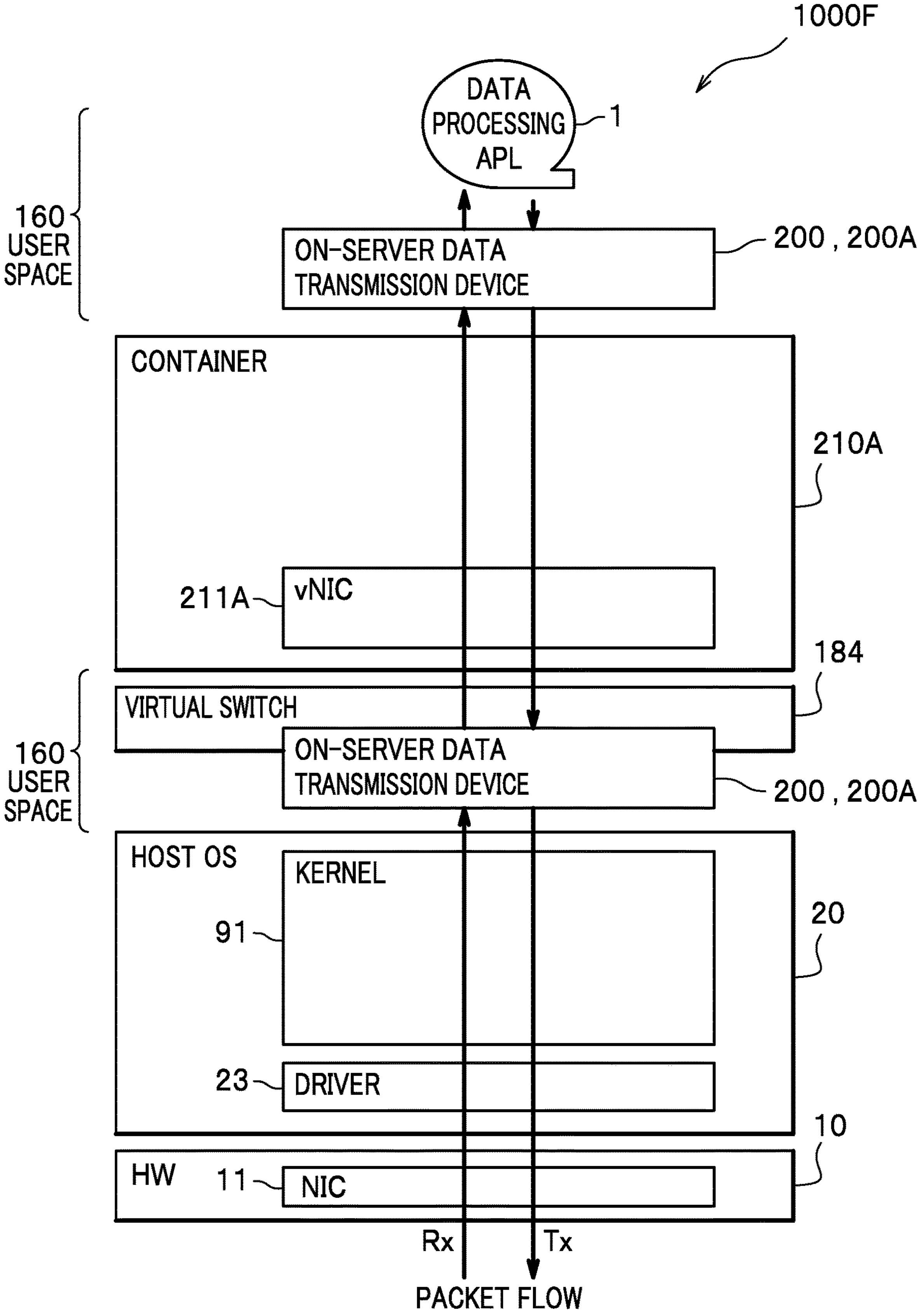
FIG. 16 is a diagram illustrating an example in which the on-server data transmission system is applied to an interrupt model in a server virtualization environment having a container configuration.

FIG. 16 is a diagram illustrating an example in which an on-server data transmission system 1000B is applied to an interrupt model in a server virtualization environment with a container configuration. The same components as those in FIG. 15 are denoted by the same reference signs as those in FIG. 15.

As illustrated in FIG. 16, on-server data transmission system 1000F has a container configuration in which a Container 210A is deployed in place of Guest OS 70. Container 210A includes a virtual NIC (vNIC) 211A. On-server data transmission devices 200 or 200A are deployed in user spaces 160.

In a virtual server system such as a container, it is possible to achieve both low latency and power saving by performing sleep control with timer control taking the data arrival timing into account. Furthermore, packet transfer can be performed with a shorter delay in the server, without any modification to the APL.

<Example of Application to Bare-Metal Configuration (Non-Virtualized Configuration)>

The present invention can be applied to a system with a non-virtualized configuration, such as in a bare-metal configuration. In a system having a non-virtualized configuration, it is possible to achieve both low latency and power saving by performing sleep control with timer control taking the data arrival timing into account. Furthermore, packet transfer can be performed with a shorter delay in the server, without any modification to the APL.

<Extended Technique>

The present invention makes it possible to scale out against a network load by increasing the number of CPUs allocated to packet arrival monitoring threads in conjunction with receive-side scaling (RSS), which is capable of processing inbound network traffic with multiple CPUs when the number of traffic flows increases.

<Example Application to a Network System in Which the Data Arrival Schedule Is Determined>

The present invention can also be applied to, as an example of a network system in which the data arrival schedule is determined, a high-speed packet transfer processing function part of a network system in which the data arrival timing needs to be guaranteed as in a time aware shaper (TAS) in a time sensitive network (TSN). It is possible to achieve both low latency and power saving in the network system in which the data arrival schedule is determined.

Third Embodiment

In the cases of the first and second embodiments, on-server data transmission device 200 or 200A is deployed in user space 160. A third embodiment includes, in the kernel, an on-server data transmission device 200B, which deploys a polling thread in the kernel and performs sleep control, instead of on-server data transmission device 200 or 200A deployed in user space 160.

Figure 17:
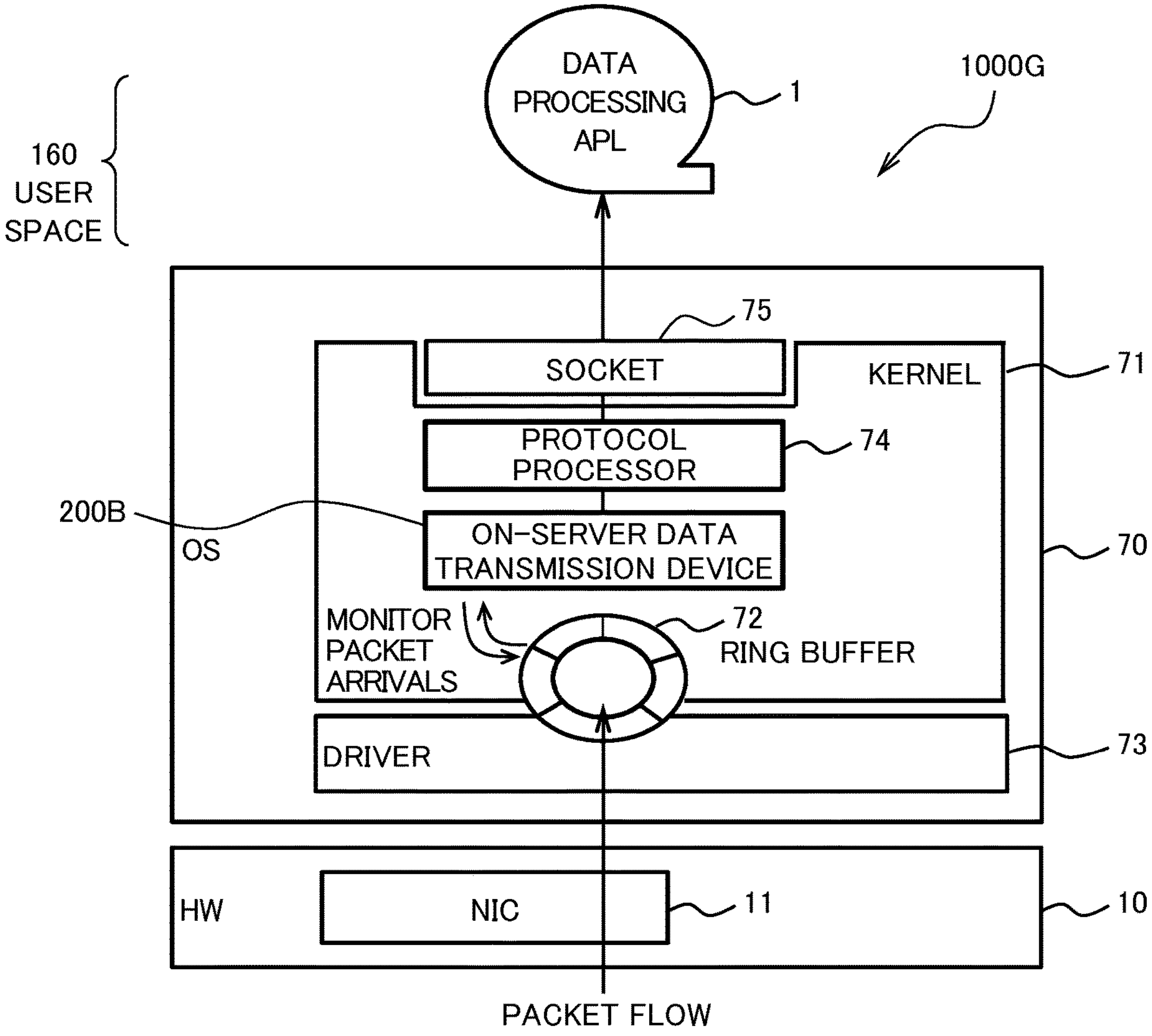
FIG. 17 is a schematic configuration diagram of an on-server data transmission system according to a third embodiment of the present invention.
Figure 21:
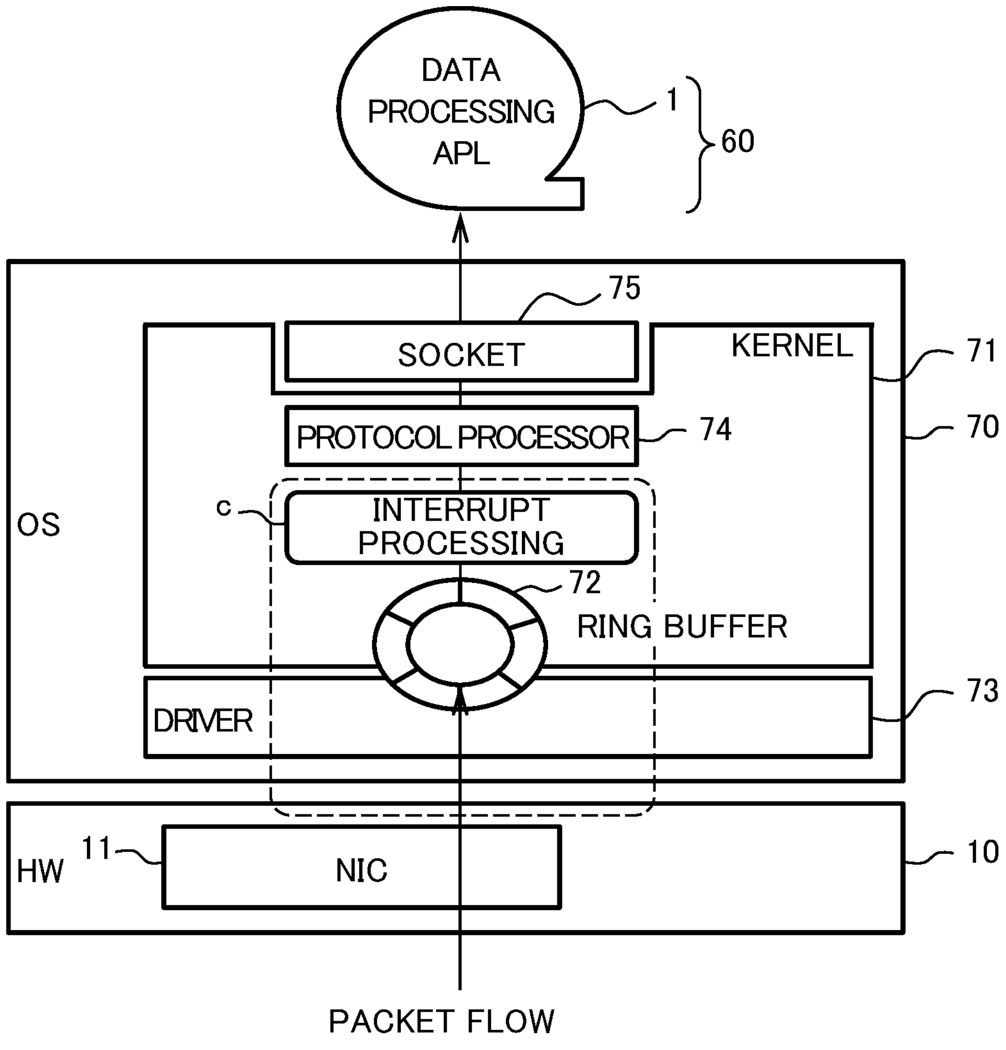
FIG. 21 is a schematic diagram of Rx-side packet processing by New API (NAPI) implemented in Linux kernel 2.5/2.6 and later versions.

FIG. 17 is a schematic configuration diagram of an on-server data transmission system according to the third embodiment of the present invention. The same components as those in FIGS. 1, 13, and 21 are denoted by the same reference signs as those in FIGS. 1, 13, and 21, and descriptions of overlapping portions are omitted. The present embodiment is an example applied to packet processing by New API (NAPI) implemented in Linux kernel 2.5/2.6 and later versions. Note that, in a case where a polling thread is to be deployed inside the kernel, it is necessary to take into account the kernel version when the polling thread is NAPI based.

As illustrated in FIG. 17, an on-server data transmission system 1000G includes HW 10, an OS 70, and an on-server data transmission device 200B deployed in a kernel 71 of OS 70. More specifically, data transfer part 220 of on-server data transmission device 200B is present only in kernel 71, and one instance of sleep control manager 210 of on-server data transmission device 200B is to be present in either user space 160 or kernel 71 (sleep control manager 210 may be deployed in either user space 160 or kernel 71). FIG. 17 illustrates an example in which data transfer part 220 and sleep control manager 210 (i.e., on-server data transmission device 200B) are deployed inside kernel 71.

Adopting a configuration in which on-server data transmission device 200B configured to perform sleep control is deployed inside kernel 71 eliminates the need for on-server data transmission device 200 or 200A to be deployed in space 160 (this case includes a mode in which on-server data transmission device 200 or 200A is deployed in the on-server data transmission system with general-purpose operations being taken into account and on-server data transmission device 200 or 200A is not used in an adaptive manner). The reason why the need for on-server data transmission device 200 or 200A is eliminated is now described. That is, in cases where DPDK is not used, a software interrupt that causes a delay problem occurs only inside kernel 71. In cases where DPDK is not used, data transfer to/from data processing APL 1 is performed using socket 75 without any interrupt. Thus, data can be transferred to data processing APL 1 at high speed even if on-server data transmission device 200 or 200A is not present in user space 160.

OS 70 includes: kernel 71; ring buffer 22 (see FIG. 19) that is managed by kernel 71, in a memory space the server deploys OS 70; poll_list 86 (see FIG. 22), in which information on net device, indicative of which device the hardware interrupt (hardIRQ) from a NIC 11 comes from, is registered; vhost-net module 221A (see FIG. 19), which is a kernel thread; a tap device 222A (see FIG. 19), which is a virtual interface created by kernel 91; and a virtual switch (br) 223A (see FIG. 19).

As described above, in on-server data transmission device 200B, at least data transfer part 220 (see FIG. 1) is deployed in Kernel 71 of OS 70.

Data transfer part 220 of on-server data transmission device 200B includes data arrival monitoring part 222 (see FIG. 1) for monitoring data arrivals from an interface part (NIC 11). When data has arrived from the interface part, the interface part copies the data into a memory space by direct memory access (DMA) without using the CPU and arranges the data with a ring-structured buffer. Data arrival monitoring part 222 detects an arrival of data by starting a thread that monitors packet arrivals using a polling model to monitor the ring-structured buffer.

Specifically, regarding data transfer part 220 of on-server data transmission device 200B, an OS (OS 70) includes: a kernel (Kernel 71); a ring buffer (ring buffer 72) that is managed by the kernel, in a memory space the server deploy the OS; and a poll list (poll_list 86) (see FIG. 22), in which information on net device, indicative of which device the hardware interrupt (hardIRQ) from an interface part (NIC 11) comes from, is registered, and data transfer part 220 of on-server data transmission device 200B launches a thread that monitors packet arrivals using a polling model in the kernel.

As described above, data transfer part 220 of on-server data transmission device 200B includes: data arrival monitoring part 222 configured to monitor (poll) the poll list; Rx data transfer part (packet dequeuer) 223 configured to, when a packet has arrived, reference the packet held in the ring buffer, and perform, based on the processing to be performed next, dequeuing to remove a corresponding queue entry from the ring buffer; and sleep controller 221 configured to, when no packet has arrived over a predetermined period of time, put the thread (polling thread) into a sleep state and cancel the sleep state with a hardware interrupt (hardIRQ) for the thread (polling thread) when a packet arrives.

With this configuration, on-server data transmission device 200B halts the software interrupts (softIRQs) that perform packet processing, which is the main cause of the occurrence of the NW delay, and executes a thread in which data arrival monitoring part 222 of on-server data transmission device 200B monitors packet arrivals; and Rx data transfer part (packet dequeuer) 223 performs packet processing according to a polling model (no softIRQ) at the arrivals of packets. In a case where there is no packet arrival over a predetermined period of time, sleep controller 221 causes the thread (polling thread) to sleep, so that the thread (polling thread) is in a sleep state while no packet is arriving.

Sleep controller 221 cancels the sleep by a hardware interrupt (hardIRQ) when a packet arrives.

As described above, on-server data transmission system 1000G includes on-server data transmission device 200B that generates the polling thread in the kernel, and data transfer part 220 of on-server data transmission device 200B wakes up the polling thread upon being triggered by a hardware interrupt from NIC 11. In particular, data transfer part 220 is characterized in waking up the polling thread with a timer in a case where the polling thread is generated in the kernel. With this configuration, on-server data transmission device 200B is able to achieve both low latency and power saving by performing sleep management on the polling thread that performs packet transfer processing.

Hardware Configuration

Figure 18:
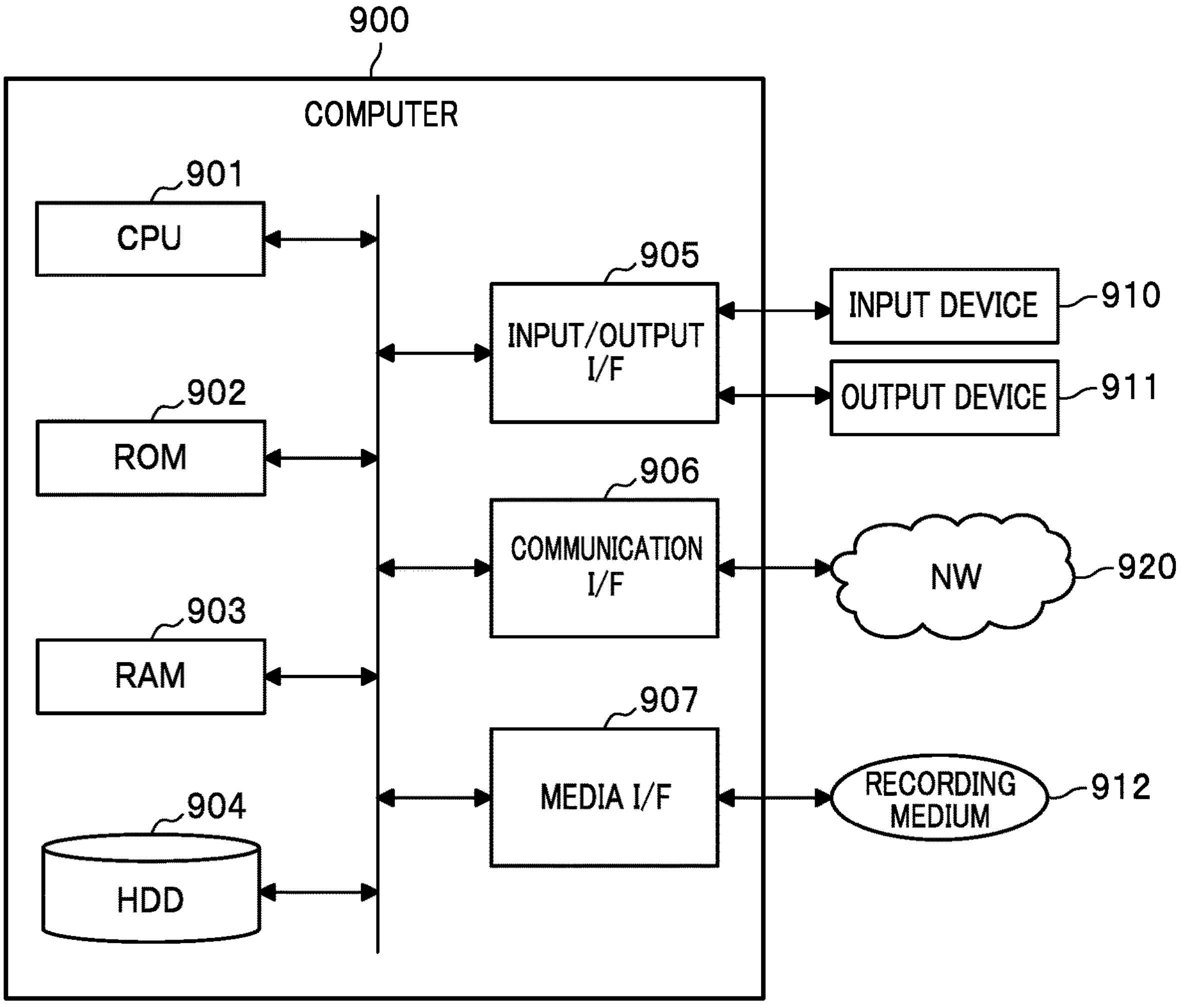
FIG. 18 is a hardware configuration diagram illustrating an example of a computer for embodying the functions of the on-server data transmission device of the on-server data transmission system according to the embodiment of the present invention.

On-server data transmission device 200, 200A, and 200B according to the above-described embodiments are each embodied by, for example, a computer 900 having a configuration such as illustrated in FIG. 18.

FIG. 18 is a hardware configuration diagram illustrating an example of computer 900 that embodies the functions of on-server data transmission device 200 or 200A.

Computer 900 has a CPU 901, a ROM 902, a RAM 903, an HDD 904, a communication interface (I/F: Interface) 906, an input/output interface (I/F) 905, and a media interface (I/F) 907.

CPU 901 operates according to a program stored in ROM 902 or HDD 904, and controls components of on-server data transmission device 200, 200A, or 200B illustrated in FIGS. 1 and 13. ROM 902 stores a boot program to be executed by CPU 901 when computer 900 starts up, a program that relies on the hardware of computer 900, and the like.

CPU 901 controls an input device 910 such as a mouse and a keyboard and an output device 911 such as a display via an input/output I/F 905. CPU 901 acquires data from an input device 910 via input/output I/F 905, and outputs generated data to output device 911. A GPU (Graphics Processing Unit) or the like may be used together with CPU 901 as a processor.

HDD 904 stores programs to be executed by CPU 901, data to be used by the programs, and the like. Communication interface 906 receives data from another device via a communication network (e.g., network (NW) 920), sends the received data to CPU 901, and transmits data generated by CPU 901 to another device via the communication network.

Media I/F 907 reads a program or data stored in a recording medium 912 and provides the read program or data to CPU 901 via RAM 903. The CPU 901 loads a program related to target processing from the recording medium 912 onto RAM 903 via media I/F 907 and executes the loaded program. Recording medium 912 is an optical recording medium such as a digital versatile disc (DVD) or a phase change rewritable disk (PD), a magneto-optical recording medium such as a magneto-optical disk (MO), a magnetic recording medium, a conductor memory tape medium, a semiconductor memory, or the like.

For example, when computer 900 functions as on-server data transmission device 200, 200A, or 200B configured as one device according to the present embodiment, CPU 901 of computer 900 embodies the functions of on-server data transmission device 200, 200A, or 200B by executing the program loaded on RAM 903. Data in RAM 903 are stored in HDD 904. CPU 901 reads a program related to target processing from recording medium 912 and executes it. In addition, CPU 901 may read a program related to target processing from another device via a communication network (NW 920).

Effects

As described above, an on-server data transmission device (on-server data transmission device 200) performs, in a user space, data transfer control on an interface part (accelerator 120 or NIC 130). An OS (OS 70) includes: a kernel (kernel 171); a ring buffer (mbuf: a ring-structured buffer to which PMD 151 copies data by DMA) in a memory space in which a server deploys the OS; and a driver (PMD 151) capable of selecting data arrival from the interface part (accelerator 120 or NIC 130) either in a polling mode or in an interrupt mode. The on-server data transmission device includes: a data transfer part (data transfer part 220) configured to launch a thread (polling thread) that monitors a packet arrival using a polling model; and a sleep control manager (sleep control manager 210) configured to manage data arrival schedule information and deliver the data arrival schedule information to the data transfer part to perform sleep control on the data transfer part. The data transfer part is configured to, based on the data arrival schedule information delivered from the sleep control manager, put the thread into a sleep state and cause a timer to expire immediately before an arrival of data to perform cancellation of the sleep state, causing the thread to wake up.

With this configuration, in order to perform sleep control on a plurality of data transfer parts according to the data arrival timing, sleep control manager 210 collectively performs sleep/activation timing control on each data transfer part 220. When data arrival is scheduled, reduction of the delay is aimed for by bypassing the kernel by performing a packet transfer in the polling mode with a low delay. Further, power saving is aimed for when no data arrival is scheduled, by suspending monitoring of data arrival and by transitioning to a sleep state. As a result, it is possible to achieve both low latency and power saving by performing sleep control with timer control taking the data arrival timing into account.

It is possible for on-server data transmission device 200 to reduce the delay by causing a data transfer delay in the server with a polling model instead of an interrupt model. That is, in on-server data transmission device 200, like DPDK, each data transfer part 220 deployed in user space 160 is able to reference the ring-structured buffer while bypassing the kernel. Further, by the polling thread constantly monitoring this ring-structured buffer, it is possible to notice a packet arrival (meaning a polling model instead of an interrupt model).

Furthermore, for a data flow in which the data arrival timing is fixedly determined, such as a time division multiplexing data flow as in signal processing in vRAN, performing sleep control on data transfer part 220 taking the data arrival schedule into account makes it possible to lower the CPU usage rate while maintaining low latency and achieve power saving. That is, it is possible to achieve both low latency and power saving by performing sleep control with timer control taking the data arrival timing into account, addressing the problem of unnecessary use of CPU resources in a polling model.

Further, a Guest OS (Guest OS 70) that operates in a virtual machine includes: a kernel (kernel 171); a ring buffer (mbuf; a ring-structured buffer to which PMD 151 copies data by DMA) in a memory space in which a server deploys the Guest OS; a driver (PMD 151) capable of selecting data arrival from an interface part (accelerator 120 or NIC 130) either in a polling mode or in an interrupt mode; and a protocol processor (protocol processor 74) configured to perform protocol processing on a packet on which dequeuing has been performed. The on-server data transmission device includes: a data transfer part (data transfer part 220) configured to launch a thread (polling thread) that monitors a packet arrival using a polling model; and a sleep control manager (sleep control manager 210) configured to manage data arrival schedule information and deliver the data arrival schedule information to the data transfer part to perform sleep control on the data transfer part. The data transfer part is configured to, based on the data arrival schedule information delivered from the sleep control manager, put the thread into a sleep state and cause a timer to expire immediately before an arrival of data to perform cancellation of the sleep state, causing the thread to wake up.

With this configuration, in a system having a virtual server configuration of a VM, it is possible for the server including a Guest OS (Guest OS 70) to lower the CPU usage rate while maintaining low latency, achieving power saving.

Moreover, a Host OS (Host OS 20) on which a virtual machine and an external process formed outside the virtual machine can operate includes: a kernel (kernel 91); a ring buffer (mbuf: a ring-structured buffer to which PMD 151 copies data by DMA) in a memory space in which the server deploys the Host OS; a driver (PMD 151) capable of selecting data arrival from an interface part (accelerator 120 or NIC 130) either in a polling mode or in an interrupt mode; and a TAP device (TAP device 222A), which is a virtual interface created by the kernel (kernel 91). The on-server data transmission device includes: a data transfer part (data transfer part 220) configured to launch a thread (polling thread) that monitors a packet arrival using a polling model; and a sleep control manager (sleep control manager 210) configured to manage data arrival schedule information and deliver the data arrival schedule information to the data transfer part to perform sleep control on the data transfer part. The data transfer part is configured to, based on the data arrival schedule information delivered from the sleep control manager, put the thread into a sleep state and cause a timer to expire immediately before an arrival of data to perform cancellation of the sleep state, causing the thread to wake up.

With this configuration, in a system having a virtual server configuration of a VM, it is possible for the server including a kernel (kernel 191) and a Host OS (Host OS 20) to lower the CPU usage rate while maintaining low latency, achieving power saving.

Further, in an on-server data transmission device (on-server data transmission device 200B), an OS (OS 70) includes: a kernel (kernel 171); a ring buffer (ring buffer 72) that is managed by the kernel, in a memory space the server deploy the OS; and a poll list (poll_list 86), in which information on net device, indicative of which device the hardware interrupt (hardIRQ) from an interface part (NIC 11) comes from, is registered. The on-server data transmission device includes: in the kernel, a data transfer part (data transfer part 220) configured to launch a thread that monitors a packet arrival using a polling model; and a sleep control manager (sleep control manager 210) configured to manage data arrival schedule, manage data arrival schedule information, and deliver the data arrival schedule information to the data transfer part to perform sleep control on the data transfer part. The data transfer part includes: a data arrival monitoring part (data arrival monitoring part 222) configured to monitor (poll) the poll list; a packet dequeuer (Rx data transfer part 223) configured to, when a packet has arrived, reference the packet held in the ring buffer, and perform, based on the processing to be performed next, dequeuing to remove a corresponding queue entry from the ring buffer; and a sleep controller (sleep controller 221) configured to, based on the data arrival schedule information received from the sleep control manager, put the thread (polling thread) into a sleep state, and perform sleep cancellation by a hardware interrupt (hardIRQ) when the sleep state is to be canceled.

With this configuration, it is possible for on-server data transmission device 200B to reduce the delay by causing a data transfer delay in the server with a polling model instead of an interrupt model. In particular, for a data flow in which the data arrival timing is fixedly determined, such as a time division multiplexing data flow as in signal processing in vRAN, performing sleep control on data transfer part 220 taking the data arrival schedule into account makes it possible to lower the CPU usage rate while maintaining low latency and achieve power saving. That is, it is possible to achieve both low latency and power saving by performing sleep control with timer control taking the data arrival timing into account, addressing the problem of unnecessary use of CPU resources in a polling model.

Data transfer part 220 is configured to, based on the data arrival schedule information received from sleep control manager 210, put the thread (polling thread) into a sleep state, and perform sleep cancellation by a hardware interrupt (hardIRQ) when the sleep state is to be canceled.

Accordingly, in addition to the above-described effects, effects (1) and (2) are further achieved.

(1) Software interrupts (softIRQs) at the arrivals of packets, which are the cause of the occurrence of a delay, are halted and the polling model is embodied in the kernel (kernel 171). That is, on-server data transmission system 1000G embodies the polling model rather than the interrupt model, which is the main cause of the NW delay, unlike NAPI of the existing technique. As the packet is immediately dequeued without a wait at the arrival of the packet, low-latency packet processing can be performed.

(2) The polling thread in on-server data transmission device 200 operates as a kernel thread and monitors packet arrivals in a polling mode. The kernel thread (polling thread) that monitors packet arrivals sleeps while there is no packet arrival. In a case where there is no packet arrival, as the CPU is not used due to the sleep, an effect of power saving can be obtained.

When a packet arrives, the polling thread in a sleep state is awoken (sleep is canceled) by the hardIRQ handler at the arrival of the packet. As the sleep is canceled by the hardIRQ handler, the polling thread can be promptly started while avoiding softIRQ contentions. Here, the cancelation of sleep is characterized in that the sleep is not canceled by a timer that is provided therein, but by the hardIRQ handler. Note that, in a case where the traffic load is known in advance, such as a case where 30 ms sleep is known like the workload transfer rate illustrated in FIG. 23, the polling thread may be awoken by the hardIRQ handler at this timing.

As described above, on-server data transmission device 200B is able to achieve both low latency and power saving by performing sleep management on the polling thread that performs packet transfer processing.

The on-server data transmission device (on-server data transmission device 200A) is characterized in including a CPU frequency setting part (CPU frequency/CPU idle controller 225) configured to lower a CPU operating frequency of a CPU core used by the thread while in the sleep state.

As described above, on-server data transmission device 200A dynamically varies the CPU operating frequency in a manner depending on the traffic. In other words, when not using the CPU due to the sleep state, the effect of power saving is further enhanced by lowering the CPU operating frequency while in the sleep state.

The on-server data transmission device (on-server data transmission device 200A) includes a CPU idle setting part (CPU frequency/CPU idle controller 225) that sets a CPU idle state of the CPU core to be used by the thread while in the sleep state to a power-saving mode.

In this manner, on-server data transmission device 200A dynamically changes the CPU idle state (a power saving function depending on the type of CPU, such as changing the operating voltage) in accordance with the traffic, so that the power saving effect can be further enhanced.

Note that among the processing described regarding the above-described embodiments, all or some of the processing described as being automatically performed can also be manually performed, or all or some of the processing described as being manually performed can also be performed automatically using a known method. Also, the processing procedure, the control procedure, specific names, and information including various types of data and parameters, which have been described in the above-presented description and drawings can be changed as appropriate unless otherwise specified.

Also, each constituent element of the illustrated devices is a functional concept, and does not necessarily need to be physically configured as illustrated in the drawings. That is, the specific forms of the distribution and integration of the devices are not limited to those illustrated in the drawings, and all or some of the specific forms can be functionally or physically distributed or integrated in any unit according to various types of loads, usage conditions, and the like.

Also, the above configurations, functions, processing parts, processing means, and the like may be embodied by hardware by designing a part or all of them with, for example, an integrated circuit, or the like. Also, each of the above configurations, functions, and the like may be embodied by software for the processor to interpret and execute a program for realizing each function. Information such as programs, tables, and files that embody each function can be stored in a memory, a recording device such as a hard disk, or an SSD (Solid State Drive), or a recording medium such as an IC (Integrated Circuit) card, an SD (Secure Digital) card, or an optical disk.

REFERENCE SIGNS LIST

1: Data processing application (APL)
2: Data flow timeslot management scheduler
3: PHY (High)
4: MAC
5: RLC
6: FAPI (FAPI P7)
20, 70: Host OS (OS)
50: Guest OS (OS)
86: Poll_list (poll list)
72: Ring buffer
91, 171, 181: Kernel
110: HW
120: Accelerator (interface part)
121: Core (core processor)
122, 131: Rx queue
123, 132: Tx queue
130: NIC (physical NIC) (interface part)
140: OS
151: PMD (driver capable of selecting data arrival either in a polling mode or in an interrupt mode)
160: User space
200, 200A, 200B: On-server data transmission device
210: Sleep control manager
210A: Container
211: Data transfer part manager
212: Data arrival schedule manager
213: Data arrival schedule delivery part
220: Data transfer part
221: Sleep controller
222: Data arrival monitoring part
223: Rx data transfer part (packet dequeuer)
224: Tx data transfer part
225: CPU frequency/CPU idle controller (CPU frequency controller, CPU idle controller)
1000, 1000A, 1000B, 1000C, 1000D, 1000E, 1000F, 1000G: On-server data transmission system
mbuf: Ring-structured buffer to which a PMD copies data by DMA

The invention claimed is:

1. An on-server data transmission device for performing, in a user space in a server deployed on a computer comprising one or more hardware processors, data transfer control on an interface part, the server implemented using one or more of the one or more hardware processors and comprising an OS, the OS comprising:

a kernel;

a ring-structured buffer in a memory space in which the server deploys the OS; and a driver capable of dynamically switching between a polling mode and an interrupt mode to monitor an arrival of data from the interface part, the on-server data transmission device implemented using one or more of the one or more hardware processors and comprising:

a data transfer part configured to launch a thread that monitors a packet arrival using the polling mode of the driver; and a sleep control manager configured to manage data arrival schedule information and deliver the data arrival schedule information to the data transfer part, wherein the data transfer part is configured to put the thread into a sleep state based on the data arrival schedule information delivered from the sleep control manager and cause a timer to expire immediately before an arrival of data to perform cancellation of the sleep state, causing the thread to wake up.

2. The on-server data transmission device according to claim 1, wherein the server comprises a virtual machine and the OS is a Guest OS configured to operate in the virtual machine.

3. The on-server data transmission device according to claim 1, wherein the OS is a Host OS on which a virtual machine and an external process formed outside the virtual machine can operate, and wherein the Host OS further comprises a tap device, which is a virtual interface created by the kernel.

4. An on-server data transmission device for performing, on a server deployed on a computer comprising one or more hardware processors, data transfer control on an interface part of the computer, the server comprising an OS and implemented using one or more of the one or more hardware processors, the OS comprising:

a kernel;

a ring-structured buffer in a memory space in which the server deploys the OS; and a poll list in which information on a net device is registered, the information on the net device being indicative of which device a hardware interrupt from an interface part comes from, the on-server data transmission device implemented using one or more of the one or more hardware processors and comprising, in the kernel:

a data transfer part configured to launch a thread that monitors a packet arrival using a polling model; and a sleep control manager configured to manage data arrival schedule information and deliver the data arrival schedule information to the data transfer part, wherein the data transfer part comprises:

a data arrival monitoring part configured to monitor the poll list;

a packet dequeuer configured to, when a packet has arrived, reference the packet held in the ring buffer and perform, based on the processing to be performed next, dequeuing to remove a corresponding queue entry from the ring buffer; and a sleep controller configured to, based on the data arrival schedule information received from the sleep control manager, put the thread into a sleep state and perform sleep cancellation by a hardware interrupt when the sleep state is to be canceled.

5. The on-server data transmission device according to claim 1, wherein the data transfer part comprises:

a CPU frequency controller configured to lower a CPU operating frequency of a CPU core used by the thread while in the sleep state.

6. The on-server data transmission device according to claim 4, wherein the data transfer part comprises:

a CPU frequency controller configured to lower a CPU operating frequency of a CPU core used by the thread while in the sleep state.

7. The on-server data transmission device according to claim 1, wherein the data transfer part comprises:

a CPU idle controller configured to set a CPU idle state of a CPU core used by the thread to a power-saving mode while in the sleep state.

8. The on-server data transmission device according to claim 4, wherein the data transfer part further comprises:

a CPU idle controller configured to set a CPU idle state of a CPU core used by the thread to a power-saving mode while in the sleep state.

9. An on-server data transmission method to be executed by an on-server data transmission device for performing, in a user space in a server deployed on a computer comprising one or more hardware processors, data transfer control on an interface part, the server implemented using one or more of the one or more hardware processors and comprising an OS, the OS comprising:

a kernel;

a ring-structured buffer in a memory space in which a server deploys the OS; and a driver capable of dynamically switching between a polling mode and an interrupt mode to monitor an arrival of data from the interface part, the on-server data transmission device implemented using one or more of the one or more hardware processors and comprising:

a data transfer part configured to launch a thread that monitors a packet arrival using the polling mode of the driver; and a sleep control manager configured to manage data arrival schedule information and deliver the data arrival schedule information to the data transfer part, the on-server data transmission method comprising:

putting, by the data transfer part, the thread into a sleep state based on the data arrival schedule information delivered from the sleep control manager; and causing, by the data transfer part, a timer to expire immediately before an arrival of data to perform cancellation of the sleep state, causing the thread to wake up.

10. A non-transitory computer-readable medium storing a computer program for an on-server data transmission device for performing, in a user space of a server deployed on a computer comprising one or more hardware processors, data transfer control on an interface part, the server implemented using one or more of the one or more hardware processors and comprising an OS, the OS comprising:

a kernel;

a ring buffer in a memory space in which the server deploys the OS; and a driver capable of dynamically switching between a polling mode and an interrupt mode to monitor an arrival of data from the interface part, the on-server data transmission device implemented using one or more of the one or more hardware processors and comprising:

a data transfer part configured to launch a thread that monitors a packet arrival using the polling mode of the driver; and a sleep control manager configured to manage data arrival schedule information and deliver the data arrival schedule information to the data transfer part, the computer program causing the data transfer part to execute:

putting the thread into a sleep state based on the data arrival schedule information delivered from the sleep control manager; and causing a timer to expire immediately before an arrival of data to perform cancellation of the sleep state, causing the thread to wake up.

* * * * *